United States Patent
Yamada et al.

(10) Patent No.: US 8,227,058 B2
(45) Date of Patent: *Jul. 24, 2012

(54) HEAT-SHRINKABLE LAMINATED FILM, MOLDED PRODUCT AND HEAT-SHRINKABLE LABEL EMPLOYING THE FILM, AND CONTAINER

(75) Inventors: Takeyoshi Yamada, Shiga (JP); You Miyashita, Shiga (JP)

(73) Assignee: Mitsubishi Plastics, Inc., Tokyo (JP)

(*) Notice: Subject to any disclaimer, the term of this patent is extended or adjusted under 35 U.S.C. 154(b) by 722 days.

This patent is subject to a terminal disclaimer.

(21) Appl. No.: 11/813,665

(22) PCT Filed: Jan. 11, 2006

(86) PCT No.: PCT/JP2006/300234
§ 371 (c)(1), (2), (4) Date: Sep. 18, 2007

(87) PCT Pub. No.: WO2006/075634
PCT Pub. Date: Jul. 20, 2006

(65) Prior Publication Data
US 2009/0022916 A1  Jan. 22, 2009

(30) Foreign Application Priority Data

Jan. 11, 2005 (JP) .................... 2005-003289
May 25, 2005 (JP) .................... 2005-151831
Aug. 31, 2005 (JP) .................... 2005-251792

(51) Int. Cl.
B65B 53/02 (2006.01)
B65B 53/00 (2006.01)
B32B 27/36 (2006.01)
B32B 27/08 (2006.01)

(52) U.S. Cl. ....... 428/34.9; 428/516; 428/483; 428/35.7

(58) Field of Classification Search ............... 428/34.9, 428/35.7, 35.9, 36.7, 483, 516; 53/442; 206/497
See application file for complete search history.

(56) References Cited

U.S. PATENT DOCUMENTS

| | | | | |
|---|---|---|---|---|
| 4,188,443 A | * | 2/1980 | Mueller et al. | 428/216 |
| 5,023,143 A | * | 6/1991 | Nelson | 428/516 |
| 5,216,050 A | * | 6/1993 | Sinclair | 524/108 |
| 5,225,490 A | * | 7/1993 | Tokiwa et al. | 525/176 |
| 5,571,864 A | * | 11/1996 | Bates et al. | 525/88 |
| 2003/0039775 A1 | * | 2/2003 | Kong | 428/34.9 |
| 2008/0311320 A1 | | 12/2008 | Hiruma et al. | |
| 2009/0202758 A1 | | 8/2009 | Hiruma et al. | |
| 2009/0263600 A1 | | 10/2009 | Miyashita et al. | |
| 2010/0143623 A1 | | 6/2010 | Hiruma et al. | |

FOREIGN PATENT DOCUMENTS

| | | |
|---|---|---|
| EP | 1 955 845 | 8/2008 |
| JP | 2000-108202 A | 4/2000 |
| JP | 2002-019053 A | 1/2002 |
| JP | 2002-234117 A | 8/2002 |
| JP | 2002-347184 A | 12/2002 |
| JP | 2003-226855 A | 8/2003 |
| JP | 2003-276144 A | 9/2003 |
| JP | 2004-002776 A | 1/2004 |
| JP | 2004-262029 A | 9/2004 |
| JP | 2004-268372 A | 9/2004 |

OTHER PUBLICATIONS

Translation of JP 2002-109053 Jul. 2007.*
European Search Report issued Dec. 21, 2011 in PCT/JP06/300234.

* cited by examiner

Primary Examiner — Rena Dye
Assistant Examiner — Erik Kashnikow
(74) Attorney, Agent, or Firm — Oblon, Spivak, McClelland, Maier & Neustadt, L.L.P.

(57) ABSTRACT

The present invention provides a heat-shrinkable laminated film including at least two layers, in which the first layer is composed of at least one kind of a polylactic acid series resin as the main component and the second layer is composed of at least one kind of a polyolefin series resin as the main component. Heat shrinkage ratio of this film in the film main shrinking direction is 30% or more when dipped in warm water of 80° C. for 10 seconds. Since this heat-shrinkable laminated film is made from a plant-derived resin, it promotes a use of biomass. Also, as this film exhibits excellent shrinkage property in low temperature, film rigidity, shrink finishing quality, and small natural shrinkage ratio, the film is suitably used for a molded product which requires heat shrinkage property, specifically, it is suitably used for shrinkable label.

18 Claims, No Drawings

HEAT-SHRINKABLE LAMINATED FILM, MOLDED PRODUCT AND HEAT-SHRINKABLE LABEL EMPLOYING THE FILM, AND CONTAINER

CROSS-REFERENCE TO PRIOR APPLICATIONS

This is a U.S. national phase application under 35 U.S.C. §371 of International Patent Application No. PCT/JP2006/300234, filed Jan. 11, 2006, which claims the benefit of Japanese Application No. 2005-003289, filed Jan. 11, 2005, Japanese Application No. 2005-151831, filed May 25, 2005, and Japanese Application No. 2005-251792, filed Aug. 31, 2005, all of which are incorporated by reference herein. The International Application was published in Japanese on Jul. 20, 2006 as International Publication No. WO 2006/075634 A1 under PCT Article 21(2).

TECHNICAL FIELD

The present invention relates to a heat-shrinkable laminated film, a molded product and a heat-shrinkable label employing the film, and a container. More particularly, the present invention relates to a heat-shrinkable laminated film, which is composed of plant-derived resins and is suitable for the use of shrinkable packing, shrinkable bond-packing, shrinkable label, and so on; the invention also relates to a molded product and a heat-shrinkable label employing the above film, and a container.

BACKGROUND ART

At present, soft drinks such as juices, or alcoholic beverages such as beer are sold in a form that the drink is filled in containers such as glass bottles or PET (polyethylene terephthalate) bottles. When the drinks are on sale, in order to differentiate the products from other products and to improve its visibility to enhance its commercial value, a heat-shrinkable label on which printing is given is often provided onto the outside of each container.

Among the above heat-shrinkable label, for label use of PET bottles with potential increase of demand, a heat-shrinkable film is requested to be able to obtain excellent shrink finishing quality within relatively short time at low temperature and to have small natural shrinkage ratio. One of the reasons is that temperature of the labeling process of the heat-shrinkable film to be fitted with recent PET bottles is required to be colder. In other words, nowadays, it is common that steam-shrinker is used to make the heat-shrinkable film shrink and to label bottles. However, in order to avoid quality loss of the content due to the heat increase, it is desirable to carry out shrinking process of the film at as low temperature as possible. This is why recent heat-shrinkable film industry is developing a heat-shrinkable film which starts shrinking in the steam-shrinker in a time of labeling at as low temperature as possible and which is able to obtain excellent shrink finishing quality after passing through the steam-shrinker.

As materials of the heat-shrinkable film, for example, a polyethylene terephthalate series resin and a polystyrene series resin are used. An elongated film formed by the above resins has high transparency, brilliance, and stiffness, together with excellent shrinkage property in low-temperature; thereby such an elongated film can be suitably used as a heat-shrinkable film. On the other hand, a polyolefin (hereinafter, it may be abbreviated as "PO".) series resin is a material having desirable features such that problems related to combustion product gas and endocrine-disrupting compound (which is the so-called "environmental hormone") are relatively few, and such that density thereof is low, which contributes for decreasing weight of waste. Nevertheless, the heat-shrinkable film composed by this PO series resin has problems such that stiffness and shrinkage property in low temperature is not sufficient, shrinkage in a time of heat shrinkage is insufficient, further natural shrinkage (it is the circumstance where a film shrinks before its original use at slightly higher temperature than room temperature, e.g. in summer season.) is easily caused.

Moreover, the above polyethylene terephthalate series resin, polystyrene series resin, and PO series resin are petroleum-derived resin; therefore there is a problem of exhaustion of crude oil. Thus, resin substitution is requested instead of petroleum-derived resin.

As a substitution of petroleum-derived resin, polylactic acid (hereinafter, it may be abbreviated as "PLA".) series resin is commonly known. PLA series resin is a plant-derived resin made from lactic acid as a material obtained by fermentation of starch; PLA can be mass-produced in way of chemical engineering and exhibit properties like excellent transparency and stiffness. Therefore, a PLA series resin has gotten a lot of attention in the fields of film packaging materials and of injection molding as a material of substitution having superior shrinkage property in low temperature to that of polyethylene terephthalate series resin, polystyrene series resin, and the like, and having excellent stiffness.

However, as a heat-shrinkable film composed of PLA series resin shows sensible change of heat shrinkage ratio to shrinking temperature, it is difficult to obtain uniform shrinkage. Thereby the film has a problem in shrink finishing quality.

While, a laminated film which is a combination of a PO series resin and a PLA series resin is reported (refer to Patent document 1 and Patent document 2.). However, in the film described in Patent document 1, a PO series resin used in the surface layer has low viscosity average molecular weight, i.e. 1000~7000, the resin cannot realize physicality such as mechanical strength and heat resistance sufficiently. Therefore, it is inappropriate to use the film for the heat-shrinkable film application. In addition, the film described in Patent document 2 has an outer layer containing 35~80 mass % of filler, thereby the film after elongation does not have transparency and does lack the mechanical strength. Furthermore, the film described in Patent document 2 has many microporous on the surface, therefore the printability and slidability is not sufficient, and it is difficult for the film to be used as labels.

In Patent document 3, a shrinkable sheet is shown, and the sheet is composed of a layer containing a PO series resin as the main component with a layer containing a PLA series resin as the main component. However, since the sheet shown in Patent document 3 is a sheet having the PO layer as the outer layer, when cylindrical seal bag-making is carried out, sealing is difficult to be conducted. Also, this sheet is a shrinkable sheet formed by inflation method. When it is used as a bottle label in which high-shrinkage in low temperature is required, there is a problem that sufficient shrinkage property in low temperature cannot be obtained.

In Patent documents 4 and 5, laminated films having a PLA series resin and a PO series resin or an ethylene-vinyl acetate copolymer (EVA) are shown. However, these inventions provides EVA layer as a surface layer and a back layer of a film for the purpose of giving heat-seal property. Thereby, the effect which the present invention aims for (namely, shrink finishing quality, transparency, solvent seal property, etc.) is not obtained.

Patent Document 1: Japanese Patent Application Laid-Open (JP-A) No. 2003-276144
Patent Document 2: JP-A No. 2002-347184
Patent Document 3: JP-A No. 2002-019053
Patent Document 4: JP-A No. 2000-108202
Patent Document 5: JP-A No. 2004-262029

DISCLOSURE OF THE INVENTION

Problems to be solved by the Invention

Accordingly, an object of the present invention is to provide a heat-shrinkable laminated film, which is composed of plant-derived resins, exhibits excellent shrinkage property in low temperature, film rigidity (stiffness at room temperature), and shrink finishing quality with small natural shrinkage, and which is suitably used for shrinkable packing, shrinkable bond-packing, and shrinkable label. The invention also provides a molded product and a heat-shrinkable label employing the above film, and a container with which the above molded product or the heat-shrinkable label is fitted.

Means for Solving the Problems

The inventors have been conducted serious studies and have acquired an idea to solve the above problems by using particular resins for each layer of the laminated film having the first and the second layers, and completed the present invention.

The first embodiment of the present invention is a heat-shrinkable laminated film comprising at least two layers of the first layer and the second layer, wherein the first layer and the second layer are composed of following respective resins as the main components, and heat shrinkage ratio in the film main shrinking direction is 30% or more when dipped in warm water of 80° C. for 10 seconds.

First layer: at least one kind of a polylactic acid series resin
Second layer: at least one kind of a polyolefin series resin The second embodiment of the present invention is a heat-shrinkable laminated film according to the first embodiment of the invention, wherein the third layer which is composed of the following resin as the main component is provided between the first layer and the second layer.

Third layer: an adhesive resin

In the first and second embodiments of the invention, it is preferable to have the first layer be placed as a surface layer and a back layer, and to have the second layer be placed as a middle layer.

In the second embodiment of the invention, the adhesive resin is at least one kind of copolymer or resin selected from a group consisting of following (a), (b) and (c).

(a) A copolymer of ethylene with at least one kind selected from a group consisting of vinyl acetate, acrylic acid, methacrylic acid, ethyl acrylate, ethyl methacrylate, methyl acrylate, methyl methacrylate, maleic anhydride, and glycidyl methacrylate; or mixture of copolymers thereof (b) A copolymer of a flexible aromatic series hydrocarbon and a conjugated diene series hydrocarbon, or hydrogenated derivatives thereof (c) A modified polyolefin series resin In the first and second embodiments of the invention, the second layer may contain a polylactic acid series resin of which mixing ratio is 3 parts by mass or more and 50 parts by mass or less (preferably 20 parts by mass) to 100 parts by mass of a polyolefin series resin.

In the second embodiment of the invention, the second layer may contain an adhesive resin of which mixing ratio is preferably 2 parts by mass or more and 10 parts by mass or less to 100 parts by mass of a polyolefin series resin.

In the first and second embodiments of the invention, the polylactic acid series resin is preferably a resin composed of a D-lactic acid copolymer and a L-lactic acid copolymer, or mixture thereof. The polyolefin series resin is preferably polyethylene series resin, polypropylene series resin, or a mixture thereof.

In the second embodiment of the invention, the heat shrinkage ratio of the heat-shrinkable laminated film in the film main shrinking direction is preferably 20% or more when dipped in warm water of 80° C. for 10 seconds.

In the first and second embodiments of the invention, the natural shrinkage ratio of the heat-shrinkable laminated film is preferably less than 3.0% after 30 days storage in an 30° C., 50% RH atmosphere.

In the first and second embodiments of the invention, thickness ratio of the first layer to thickness of the entire film is preferably 10% or more and 70% or less.

The third embodiment of the invention is a molded product employing the above heat-shrinkable laminated film as a base material.

The fourth embodiment of the invention is a heat-shrinkable label employing the above heat-shrinkable laminated film as a base material.

The fifth embodiment of the invention is a container having the above molded product or heat-shrinkable label.

Effects of the Invention

According to the present invention, since a heat-shrinkable laminated film has both the first layer composed of a PLA series resin and the second layer composed of a PO series resin, it is capable to obtain a heat-shrinkable laminated film, which exhibits excellent shrinkage property in low temperature, film rigidity (stiffness at room temperature), shrink finishing quality, and small natural shrinkage ratio, and which is suitably used for shrinkable packing, shrinkable bond-packing, and shrinkable label; such an excellent properties could not be obtained with a heat-shrinkable film composed of a PLA series resin only or a PO series resin only. Moreover, the PLA series resin to be used in the invention is plant-derived resin; therefore, according to the invention, it is suitably used for promoting a use of biomass to develop recycling society.

Further, as the molded product and the heat-shrinkable label of the invention are composed of the heat-shrinkable laminated film of the invention, according to the invention, it is capable to provide a molded product and a heat-shrinkable label having excellent film rigidity and shrink finishing quality. Furthermore, the container of the invention has the above molded product or heat-shrinkable label, according to the invention, it is capable to provide a container with pleasing appearance.

BEST MODE FOR CARRYING OUT THE INVENTION

The heat-shrinkable laminated film, the molded product, the heat-shrinkable label, and the container having the above molded product and label of the invention (hereinafter, these may be abbreviated as "film of the invention", "molded product of the invention", "label of the invention", and "container of the invention".) will be described in detail as follows.

In this description, "as the main component" means an intention that allows to contain other components in the range without preventing the effect of resins constituting individual layers. This term does not particularly limit the content ratio.

However, content ratio of the main component is 50 mass % or more to total mass of components of each layer, preferably 70 mass % or more, further preferably 80 mass % or more, furthermore preferably 90 mass % or more, and 100 mass % or less.

<Heat-shrinkable Laminated Film>

The first embodiment of the present invention is a heat-shrinkable laminated film comprising at least two layers of the first layer and the second layer, wherein the first layer contains at least one kind of a polylactic acid series resin (PLA series resin) as the main component, and the second layer contains at least one kind of a polyolefin series resin (PO series resin) as the main component.

(The First Layer)

In the film of the present invention, the first layer is a layer having a polylactic acid series resin (PLA series resin) as the main component. Since the film of the invention thus has the first layer containing a PLA series resin as the main component and such first layer is used for the surface layer and the back layer as a preferable embodiment of layer composition, the film of the invention has following advantages. Firstly, the film can obtain superior shrinkage property in low temperature and stiffness to that of the heat-shrinkable film whose surface layer and back layer are composed of polyethylene terephthalate series resin or polystyrene series resin. Secondly, as it is capable to obtain excellent ink adhesiveness at a time of printing compared with that of heat-shrinkable film whose surface layer and back layer are composed of PO series resin, it is possible to omit processes like corona discharge treatment after film-forming. Thereby manufacturing process can be simplified. Thirdly, as the film has excellent sealing property by solvent like THF during bag-making, it is capable to make bag without using adhesives at a time of sealing. Thereby it is possible to reduce the cost of manufacturing.

The kind of PLA series resin to be used for the film of the invention is not particularly limited, however it is suitable to use a copolymer (poly(DL-lactic acid)) having L-lactic acid and D-lactic acid as the structural unit, and mixtures thereof.

In the copolymer having L-lactic acid and D-lactic acid as the structural unit, the copolymerization ratio of the D-lactic acid and the L-lactic acid is: (D-lactic acid)/(L-lactic acid) =99.5/0.5~85/15, or (D-lactic acid)/(L-lactic acid)=0.5/99.5~15/85. Preferably, it is (D-lactic acid)/(L-lactic acid) =99/1~87/13, or (D-lactic acid)/(L-lactic acid)=1/99~13/87. When a PLA series resin having the above copolymerization ratio is used, problems such as lack of heat resistance caused by the too low crystalline and such as fusion between neighboring films cannot be occurred.

As a PLA series resin used in the first layer, plurality of PLA series resins, each of which copolymerization rate between L-lactic acid (hereinafter, refer to L-body.) and D-lactic acid (hereinafter, refer to D-body.) is different, may be blended and used. In such a case, it is preferable to blend the plurality of PLA series resins so as to make the average of the copolymerization ratio of L-body and D-body in the plurality of PLA series resins be within the above range.

The above PLA series resin can be copolymerized by using any commonly known methods like condensation polymerization method and ring-opening polymerization method. For example, in condensation polymerization method, by directly having dehydration condensation polymerization with L-lactic acid or D-lactic acid, or mixture thereof, it is capable to obtain a PLA series resin having various compositions. Further, in ring-opening polymerization method (lactide method), by making lactide which is a cyclic dimer of lactic acid react with using necessary amount of polymerization adjuster and suitable catalyst like tin octylic acid, it is capable to obtain a PLA series resin. Among the lactide, there exists L-lactide which is a dimer of L-lactic acid, D-lactide which is a dimer of D-lactic acid, further DL-lactide made from both L-lactic acid and D-lactic acid. By mixing these lactides as the need arise and polymerizing them, it is capable to obtain a PLA series resin having various composition and crystalline.

In the invention, in order to improve the heat resistance of the film, as long as substantial characteristic of the above PLA series resin is not damaged, as a copolymer component of small amount other than lactic acid, it is capable to use at least one kind of compound selected from a group consisting of: α-hydroxycarboxylic acid; non-aliphatic dicarboxylic acid such as terephthalic acid; aliphatic dicarboxylic acid such as succinic acid; non-aliphatic diol such as ethyleneoxide adduct of bisphenol A; and aliphatic diol such as ethylene glycol. While, in order to extend the molecular weight, small amount of chain extender, for instance, diisocyanate compound, epoxy compound, and acid anhydride, may be used.

Examples of α-hydroxycarboxylic acid other than lactic acid include di-functionalized aliphatic hydroxycarboxylic acid such as glycolic acid, 3-hydroxy lactic acid, 4-hydroxy lactic acid, 2-hydroxyl-n-lactic acid, 2-hydroxy-3,3-dimethyl lactic acid, 2-hydroxy-3-methyl lactic acid, 2-methyl lactic acid, 2-hydroxy caproic acid; and lactone group such as caprolactone, butyrolactone, and valerolactone.

Also, examples of aliphatic diol include ethylene glycol, 1,4-butanediol, 1,4-cyclohexane dimethanol. While, examples of aliphatic dicarboxylic acid include succinic acid, adipic acid, suberic acid, sebacic acid, and dodecanedioic acid.

The copolymerization ratio of lactic acid with α-hydroxycarboxylic acid, aliphatic diol, or aliphatic dicarboxylic acid is: preferably, (lactic acid):(α-hydroxycarboxylic acid, aliphatic diol, or aliphatic dicarboxylic acid)=90:10~10:90, more preferably, 80:20~20:80, further preferably 30:70~70:30. When the copolymerization ratio is within the above range, it is capable to obtain the film which has well-balanced physicality such as stiffness, transparency, and impact-resistance. Examples of structure of these copolymers include random copolymer, block copolymer, and graft copolymer; any of these structures are available in the invention. However, from the viewpoint of impact-resistance and transparency of the film, it is preferable to use block copolymer or graft copolymer.

The PLA series resin used in the invention has weight-average molecular weight of which lower limit is preferably 50,000, more preferably 100,000, and the upper limit is preferably 400,000, more preferably 300,000, furthermore preferably 250,000. If weight-average molecular weight of the PLA series resin is too small, practical physicality like mechanical physicality and heat resistance are hardly realized; whereas, if it is too large, melt viscosity of the resin becomes too high thereby such a resin lacks workability in the manufacturing process.

Representative examples of the PLA series resin suitably used in the invention are "LACEA" manufactured by Mitsui Chemicals, Inc. and "Nature Works" manufactured by Nature Works LLC as commercially available products. Moreover, a specific example of random copolymer of a PLA series resin, a diol, and a carboxylic acid is "GS-Pla" manufactured by Mitsubishi Chemical Corporation; and a specific example of block copolymer or graft copolymer is "Plamate" manufactured by Dainippon Ink and Chemicals Incorporated.

In the invention, in order to improve impact-resistance, cold-resistance, and so on, aliphatic polyester resin, aromatic polyester resin, and so on, each of which has the glass transition temperature (Tg) at 0° C. or less, may be blended within the range of 70 parts by mass or less to 100 parts by mass of PLA series resin. Examples of such aliphatic polyester resin include an aliphatic polyester obtained by condensing an aliphatic diol and an aliphatic dicarboxylic resin, an aliphatic polyester obtained by ring-opening polymerization of cyclic lactones, and an aliphatic polyester resin other than PLA series resin such as synthetic aliphatic polyester.

Specifically, the aliphatic polyester obtained by condensing an aliphatic diol and an aliphatic dicarboxylic acid can be obtained by conducting condensation polymerization of compounds of at least one kind selected from a group consisting of: an aliphatic diol such as ethylene glycol, 1,4-butanediol, hexanediol, octanediol, cyclopentanediol, cyclohexanediol, 1,4-cyclohexane dimethanol, or anhydrides and derivatives thereof; and an aliphatic dicarboxylic acid such as succinic acid, adipic acid, suberic acid, sebacic acid, and dodecanedioic acid, or anhydrides and derivatives thereof. By adding isocyanate compounds as need arise to the condensation polymerization, it is capable to obtain a desired polymer.

In order to enhance heat resistance and mechanical strength of the film, it may be possible to copolymerize an aromatic monomer like 50 mole % or less of terephthalic acid as the dicarboxylic acid component. Examples of PLA series resin having such component include "Easter Bio" (commodity name) manufactured by Eastman Chemical Company, and "Ecoflex" (commodity name) manufactured by BASF Japan Ltd.

Also, examples of an aliphatic polyester manufactured by ring-opening polymerization of cyclic lactones include aliphatic polyesters obtained by polymerizing at least one kind of cyclic monomer selected from a group consisting of ε-caprolactone, δ-valerolactone, and β-methyl-δ-valerolactone. As the aliphatic polyester obtained by ring-opening polymerization of ε-caprolactone, for example, "Celgreen" manufactured by Daicel Chemical Industries, Ltd. is commercially available.

Further, examples of synthetic aliphatic polyester include a copolymer polymerized by cyclic acid anhydride such as succinic anhydride with an oxirane such as ethylene oxide and propylene oxide.

(The Second Layer)

In the heat-shrinkable laminated film of the present invention, the second layer is a layer having a PO series resin as the main component.

The PO series resin to be used in the invention is not limited. Examples of the available PO series resin include a polyethylene series resin, a polypropylene series resin, and an ethylene series copolymer such as ethylene-vinyl acetate copolymer, ethylene-ethyl acrylate copolymer, and ethylene-methylacrylate copolymer. Among them, from the viewpoint of heat-shrinkage ratio and formability, it is preferable to use a polyethylene series resin, a polypropylene series resin, and mixture thereof. As various kinds of a polyethylene series resin and a polypropylene series resin are produced depend on the method of polymerization and copolymerization components, thus such a polyethylene series resin and a polypropylene series resin are not limited within the range. Preferable kinds thereof will be shown as below.

Examples of the polyethylene series resin of the invention usually include high-density polyethylene resin (HDPE) of which density is 0.940 g/cm$^3$ or more and 0.970 g/cm$^3$ or less, medium-density polyethylene (MDPE) of which density is 0.920 g/cm$^3$ or more and 0.940 g/cm$^3$ or less, low-density polyethylene (LDPE) of which density is less than 0.920 g/cm$^3$, and linear low-density polyethylene resin (LLDPE). Among these, from the viewpoint of elongation property, impact-resistance and transparency of the film, etc., linear low-density polyethylene resin (LLDPE) is specifically preferably used.

As the above linear low-density polyethylene resin (LLDPE), a copolymer of ethylene with α-olefin having carbon number 3 or more and 20 or less, preferably carbon number 4 or more and 12 or less. Examples of the α-olefin include propylene, 1-butene, 1-pentene, 1-hexene, 1-heptene, 1-octene, 1-nonene, 1-decene, 3-methyl-1-butene, 4-methyl-1-pentene. Among these, 1-butene, 1-hexene, and 1-octene are preferably used. As an α-olefin to be copolymerized, one kind of α-olefin alone or combination of two or more thereof may be used.

As a preferable density of the above polyethylene series resin, the lower limit is preferably 0.800 g/cm$^3$ or more, more preferably 0.850 g/cm$^3$ or more, furthermore preferably 0.900 g/cm$^3$ or more. While, the upper limit is preferably 0.950 g/cm$^3$ or less, more preferably 0.940 g/cm$^3$ or less, furthermore preferably 0.930 g/cm$^3$ or less. When the density is 0.800 g/cm$^3$ or more, a film maintains rigidity (stiffness at room temperature) of the entire film and heat resistance without having significant deterioration, therefore it is practically preferable. On the other hand, when the density is 0.950 g/cm$^3$ or less, elongation property at low temperature is maintained, and heat-shrinkage ratio in the practical temperature range (around 70° C. or more and 90° C. or less) can be sufficiently obtained. This is thus preferable.

As the above polyethylene series resin, the one of which melt flow rate (MFR: JIS K7210, temperature: 190° C., load: 2.16 kg) is 0.1 g/10 min or more and 10 g/10 min or less is preferably used. When MFR is 0.1 g/10 min or more, it is capable to favorably maintain the extruding workability; while, when MFR is 10 g/10 min or less, the laminated film is resistant to cause thick spots and deterioration of dynamical strength. Thus, it is preferable.

Examples of polypropylene series resin to be used in the invention include homo propylene resin, random polypropylene resin, block polypropylene resin, propylene-ethylene rubber. Among them, from the viewpoint of elongation property, transparency, stiffness and so on, random polypropylene resin is especially suitably used.

In the above random polypropylene resin, an α-olefin to be copolymerized with propylene is preferably a compound having carbon number 2 or more and 20 or less, more preferably carbon number 4 or more and 12 or less. The examples include ethylene, 1-butene, 1-pentene, 1-hexene, 1-heptene, 1-octene, 1-nonene, and 1-decene. In the invention, from the viewpoint of elongation property, impact-resistance, transparency, stiffness of the film and so on, a random polypropylene in which content ratio of ethylene unit as an α-olefin is 2 mass % or more and 10 mass % or less is especially suitably used. The α-olefin to be copolymerized may be used alone or in combination with two or more thereof.

Melt flow rate (MFR) of the polypropylene series resin is not particularly limited. However, such MFR (JIS K7210, temperature: 230° C., load: 2.16 kg) is preferably 0.5 g/10 min or more, more preferably 1.0 g/10 min or more; and it is preferably 15 g/10 min or less, more preferably 10 g/10 min or less.

Examples of such polyethylene series resin and polypropylene series resin are particularly as shown below. For the polyethylene series resin, the following examples can be commercially available: "Novatec HD, LD, LL", "Carnel", "Tufmer A, P" (commodity names) manufactured by Japan Polyethylene Corporation, "Suntec HD, LD" (commodity name) manufactured by Asahi Kasei Chemicals Corporation, "HIZEX", "ULTZEX", "EVOLUE" (commodity names)

manufactured by Mitsui Chemicals Inc., "Moatec" (commodity name) manufactured by Idemitsu Kosan Co., Ltd., "UBE polyethylene", "UMERIT" (commodity names) manufactured by Ube Industries, Ltd., "NUC polyethylene", "Nuc flex" (commodity names) manufactured by Nippon Unicar Company Limited, and "Engage" (commodity name) manufactured by The Dow Chemical Company. Also, for the polypropylene series resin, the following examples can be commercially available: "Novatec PP", "WINTEC", "Tufmer XR" (commodity names) manufactured by Japan Polypropylene Corporation, "Mitsui polypro" (commodity name) manufactured by Mitsui Chemicals Inc., "Sumitomo Noblen", "Tuf-selen", "Excellen EPX" (commodity names) manufactured by Sumitomo Chemical Co., Ltd., "IDEMITSU PP", "IDEMITSU TPO" (commodity names) manufactured by Idemitsu Kosan Co., Ltd., and "Adflex", "Adsyl" (commodity names) manufactured by SunAllomer Ltd. These copolymers may be used alone, or in combination with two or more thereof.

Further, as a PO series resin to be used for the second layer, a copolymer obtained by ethylene with a copolymerable monomer can be suitably used. Examples of the copolymer obtained by ethylene with a copolymerable monomer include ethylene-vinyl acetate copolymer, ethylene-ethyl acrylate copolymer, and ethylene-methyl acrylate copolymer. Among them, from the viewpoint of transparency and economic efficiency, ethylene-vinyl acetate copolymer is especially suitably used.

Ethylene content ratio of the above ethylene-vinyl acetate copolymer, ethylene-ethyl acrylate copolymer, and ethylene-methyl acrylate copolymer is 50 mass % or more, preferably 60 mass % or more, furthermore preferably 70 mass %. It is also 95 mass % or less, preferably 90 mass % or less, furthermore preferably 85 mass % or less. When the ethylene content ratio is 50 mass % or more, it is capable for the film to preferably maintain stiffness and heat resistance of the entire film. While, when the ethylene content ratio is 95 mass % or less, it is capable for the film to obtain sufficient effect in rupture-resistance and transparency of the film. Thereby, these ratios are preferable.

Examples of commercially available ethylene-vinyl acetate copolymer (EVA) include "Evaflex" manufactured by Du Pont-Mitsui Polychemicals Co., Ltd., "Novatec EVA" manufactured by Mitsubishi Chemical Corporation, "Evathlene" manufactured by Dainippon Ink and Chemcals, Incorporated, "Evatate" manufactured by Sumitomo Chemical Co., Ltd. Also, as an example of ethylene-ethyl acrylate copolymer (EEA), "Evaflex EEA" manufactured by Du Pont-Mitsui Polychemicals Co., Ltd. is commercially available; as an example of ethylene-methyl acrylate copolymer, "Elvaloy AC" manufactured by Du Pont-Mitsui Polychemicals Co., Ltd. is commercially available.

MFR of the above copolymer obtained by ethylene with copolymerable monomer is not particularly limited. However, the MFR (JIS K7210, temperature: 190° C., load: 2.16 kg) is preferably 0.5 g/10 min or more, more preferably 1.0 g/10 min or more, and 15 g/10 min or less, more preferably 10 g/10 min or less.

As a PO series resin in the second layer, lower limit of the weight-average molecular weight is preferably 50,000, more preferably 100,000, and upper limit of the same is preferably 700,000, more preferably 600,000, furthermore preferably 500,000. When the weight-average molecular weight of the PO series resin is within the above range, it is capable for a film to realize desirable practical physicality such as mechanical physicality and heat resistance. Moreover, it is capable to obtain appropriate melt viscosity and preferable workability.

The manufacturing method of the above PO series resin is not particularly limited. Examples of the manufacturing method include commonly known copolymerization method using commonly known catalyst for olefin copolymerization, (for example, a method with use of multisite catalyst represented by Ziegler-Natta Catalyst and a method with use of singlesite catalyst represented by metallocen series catalyst) such as slurry copolymerization, solution copolymerization, mass polymerization, and gas-phase polymerization; the example also include mass polymerization using radical initiator.

Further, in the present invention, in order to make the PO series resin adjust heat shrinkage ratio of the film, it is possible to add certain amount of petroleum resin and the like, if necessary. By adding petroleum resin, elongation property at low temperature can be maintained; thereby improvement of heat-shrinkable property is expected.

Examples of the above petroleum resin include alicyclic petroleum resin made from cyclopentadiene or dimer thereof, or aromatic petroleum resin made of $C_9$ component. Petroleum resins exhibit relatively excellent compatibility with PO series resin and the like when it is mixed thereto. However, from the viewpoint of color tone, heat stability, and compatibility, it is preferable to use hydrogenated derivatives.

As such petroleum resin, specifically, the following commercially available product can be used: "High Lets", "Petrogine" (commodity names) manufactured by Mitsui Chemicals, Inc., "Alcon" (commodity name) manufactured by Arakawa Chemical Industries, Ltd., "I-MARV" (commodity name) manufactured by Idemitsu Kosan Co., Ltd., "Escolets" (commodity name) manufactured by TONEX Co., Ltd. (merged to become Tonen Kagaku K.K.).

Among petroleum resins, there is a certain product having various softening points mainly depending on the molecular weight. In the present invention, a product (of which softening point is 100° C. or more and 150° C. or less, preferably 110° C. or more and 140° C. or less) is suitably used. When the softening point is 100° C. or more, at a time of addition to a PO series resin, the petroleum resin does not breed onto the sheet surface. Because of this, blocking is not caused, and decline of mechanical strength is not also caused. Therefore, the entire sheet does not become breakable, and thus it is practically preferable. On the other hand, when the softening point is 150° C. or less, compatibility with a PO series resin is appropriate, the petroleum resin does not breed onto the film surface over time, blocking and deterioration of transparency are not caused, thereby it is preferable.

Mixing amount of the petroleum resin to be added to the second layer is preferably 5 parts by mass or more and 80 parts by mass or less to 100 parts by mass of a PO series resin constituting the second layer. Here, when the mixing amount of the petroleum resin is 5 parts by mass or more, improvement of degree of brilliance and shrinkage property is remarkable, therefore it is preferable. While, when the mixing amount of the same is 80 parts by mass or less, the petroleum resin does not breed onto the film surface over time, thereby it is capable to avoid occurrence of problems such as easiness of blocking between neighboring films, and decline of impact-resistance. In this way, the mixing amount of petroleum resin to be added to the second layer is preferably 10 parts by mass or more and 60 parts by mass or less to 100 parts by mass of a PO series resin constituting the second layer.

The second layer may include a PLA series resin. The PLA series resin has relatively similar refractive index to that of PO series resin. When the resin is made into a film, the transparency is not obstructed, thereby it can have favorable transparency. Mixing ratio of the PLA series resin is preferably 3 parts by mass or more, more preferably 5 parts by mass or more, furthermore preferably 7 parts by mass or more to 100 parts by mass of PO series resin. It is also preferably 50 parts by mass or less, more preferably 40 parts by mass or less, further preferably 30 parts by mass or less, furthermore preferably 20 parts by mass or less to 100 parts by mass of PO series resin. Thus, when 3 parts by mass or more PLA series resin is mixed to 100 parts by mass of PO series resin, shrinkage property in low temperature can be improved, and the adhesive strength with the first layer can be enhanced. While, when mixing ratio of PO series resin is to be 50 parts by mass or less, transparency of the obtained laminated film can be maintained.

Moreover, the second layer may include adhesive resin. When the adhesive resin is mixed in the second layer, which enhances the dispersiveness of the PLA series resin in the second layer, and improve the film's transparency. Further, by adding the adhesive resin, preferable effect like improvement of the interlayer adhesive strength with the first layer and impact-resistance can be obtained. Mixing ratio of the adhesive resin is not particularly limited unless otherwise inhibiting the effect of transparency and shrinkage property. However, to 100 parts by mass of PO series resin, it is preferably 2 parts by mass or more, preferably 3 parts by mass or more, furthermore preferably 4 parts by mass or more, and it is also 10 parts by mass or less, preferably 8 parts by mass or less so as to maintain favorable transparency and shrinkage property. As an adhesive resin, one which constitutes the third layer described below can be used.

The second layer can also include a resin constituting the first layer. As described above, a PLA series resin constituting the first layer has relatively similar refractive index to that of a PO series resin. Therefore, even if a recycled resin obtained by trimming loss like heels of films and the like is added to the second layer, the transparency of the film is not inhibited; thereby favorable transparency can be maintained.

Content of resin composing the first layer which can be added to the second layer is, to 100 parts by mass of resin composing the second layer, preferably 30 parts by mass or less, more preferably 25 parts by mass or less, further preferably 23 parts by mass or less. By having 30 parts by mass or less of the resin composing the first layer to 100 parts by mass of the resin composing the second layer, it is capable to maintain transparency of the obtained laminated film.

(The Third Layer)

The second embodiment of the film of the present invention is a heat-shrinkable laminated film having the third layer composed of adhesive resin as the main component and placed between the first layer and the second layer of a laminated film of the above-mentioned first embodiment. The third layer is an adhesive resin as the main component for adhering the above first layer and the second layer. The adhesive resin contained in the third layer as the main component is not particularly limited as long as it is a capable resin to adhere each of the first layer and the second layer each other. It is preferable to use at least one kind of copolymer or resin selected from a group consisting of (a), (b), and (c) below.

(a) A copolymer of ethylene (hereinafter, it may be referred to as "ethylene series copolymer".) with one kind selected from a group consisting of: vinyl acetate, acrylic acid, methacrylic acid, ethyl acrylate, ethyl methacrylate, methyl acrylate, methyl methacrylate, maleic anhydride, and glycidyl methacrylate (b) A copolymer of flexible aromatic series hydrocarbon and a conjugated diene series hydrocarbon, or hydrogenated derivatives thereof (c) A modified polyolefin series resin Firstly, an ethylene series copolymer in (a) will be described. The examples of the above ethylene series copolymer include ethylene-vinyl acetate copolymer, ethylene-acrylic acid copolymer, ethylene-methacrylic acid copolymer, ethylene-ethyl acrylate copolymer, ethylene-ethyl methacrylate copolymer, ethylene-methyl acrylate copolymer, ethylene-methyl methacrylate copolymer, ethylene-vinyl acetate-maleic anhydride terpolymer, ethylene-ethyl acrylate-maleic anhydride terpolymer, ethylene-glycidyl methacrylate copolymer, ethylene-vinyl acetate-glycidyl methacrylate terpolymer, and ethylene-ethyl acrylate-glycidyl methacrylate terpolymer. Among them, ethylene-vinyl acetate copolymer, ethylene-acrylic acid copolymer, ethylene-ethyl acrylate copolymer, ethylene-methacrylic acid copolymer, ethylene-ethyl acrylate copolymer, and ethylene-ethyl methacrylate copolymer, are suitably used.

The above ethylene series copolymer is desirably set the content ratio of ethylene unit in the range of 50 mole % or more and 95 mole % or less, preferably 60 mole % or more and 85 mole % or less. When the content ratio of the ethylene unit is 50 mole % or more, stiffness of the entire film can be favorably maintained, therefore it is preferable. On the other hand, when the content ratio of the ethylene unit is 95 mole % or less, sufficient flexibility can be maintained. Therefore, when the film is stressed, cushioning action against the stress occurred between the first and the second layers, thereby interlayer peeling can be avoided.

In the above ethylene series copolymer, MFR (JIS K7210, temperature: 190° C., load: 2.16 kg) is preferably 0.1 g/10 min or more and 10 g/10 min or less. When MFR is 0.1 g/10 min or more, it is capable to favorably maintain extrusion workability; while, when MFR is 10 g/10 min or less, it is avoidable to cause thick spots and decline of dynamical strength of the laminated film. Thus, it is preferable.

In the above ethylene series copolymer, "Bondine" manufactured by Sumitomo Chemical Co., Ltd is commercially available as an ethylene-vinyl acetate-maleic anhydride terpolymer; and "Bond-fast" manufactured by Sumitomo Chemical Co., Ltd is also commercially available as an ethylene-glycidyl methacrylate copolymer, ethylene-vinyl acetate-glycidyl methacrylate terpolymer, and ethylene-ethyl acrylate-glycidyl methacrylate terpolymer.

Secondly, a copolymer of flexible aromatic series hydrocarbon and a conjugated diene series hydrocarbon, or hydrogenated derivatives thereof in above (b) will be described. As a flexible aromatic series hydrocarbon, styrene is suitably used, a styrene congener like α-methylstyrene can also be used. While, as a conjugated diene series hydrocarbon, 1,3-butadiene, 1,2-isoprene, 1,4-isoprene, 1,3-pentadiene and so on are used, these may be the hydrogenated derivatives. These may be used alone or in combination with two or more thereof.

In a copolymer of the above flexible aromatic series hydrocarbon and conjugated diene series hydrocarbon, or hydrogenated derivatives thereof, the content ratio of the flexible aromatic series hydrocarbon is, to the total mass of the copolymer (100 mass %), preferably 5 mass % or more, more preferably 7 mass % or more, furthermore preferably 10 mass % or more; and it is preferably 50 mass % or less, more preferably 40 mass % or less, furthermore preferably 35 mass % or less. When the content ratio of the flexible aromatic series hydrocarbon is 5 mass % or more, if the recycled film is added to any one of layers selected from the first layer, the second layer and the third layer (preferably the second layer), a favorable compatibility can be obtained. Thereby white turbidity of the film can be inhibited. While, when the content rate of the aromatic series hydrocarbon is 50 mass % or less, flexibility of the third layer is not deteriorated. In such condition, if a film is stressed, cushioning action against the stress is arised between the first and second layers, thereby interlayer peeling can be inhibited.

As a hydrogenated derivatives of a copolymer of flexible aromatic series hydrocarbon and a conjugated diene hydrocarbon, a hydrogenated derivatives of a styrene-conjugated diene series random copolymer can be suitably used. Detailed content and manufacturing method about the hydrogenated derivatives of the styrene-conjugated diene series random copolymer is disclosed in Japanese Patent Application Laid-Open (JP-A) No. 2-158643, JP-A No. 2-305814, and JP-A No. 3-72512.

The flexible aromatic series hydrocarbon-conjugated diene series copolymer may be used with addition of single or two or more copolymer shown above.

Examples of commercially available flexible aromatic series hydrocarbon-conjugated diene series hydrocarbon copolymer include: a styrene-butadiene block copolymer elastomer, "Tufprene" (commodity name) manufactured by Asahi Kasei Chemicals Corporation.; a hydrogenated derivatives of a styrene-butadiene block copolymer, "Tuftec H" (commodity name) manufactured by Asahi Kasei Chemicals Corporation. and "Kraton G" manufactured by Kraton Polymer Japan LLC; a hydrogenated derivatives of a styrene-butadiene random copolymer, "Dynaron" (commodity name) manufactured by JSR Corporation; a hydrogenated derivatives of a styrene-isoprene block copolymer, "Septon" (commodity name) manufactured by Kuraray Co., Ltd.; and a styrene-vinyl isoprene block copolymer elastomer, "Hybrar" (commodity name) manufactured by Kuraray Co., Ltd.

Also, the copolymer of the above flexible aromatic hydrocarbon and conjugated diene series hydrocarbon, or hydrogenated derivatives thereof can further improve interlayer adhesion to the first layer having PLA series resin as the main component by introducing polar group. Examples of polar groups to be introduced include: acid anhydride group, carboxylic acid group, carboxylic acid ester group, carboxylic acid chloride group, carboxylic acid amide group, carboxylate group, sulfonic acid group, sulfonic acid ester group, sulfonate chloride group, sulfonate amide group, sulfonate group, epoxy group, amino group, imide group, oxazoline group, and hydroxyl group. Also, typical examples of a copolymer of a styrene series compound and a conjugated diene into which polar group is introduced, or hydrogenated derivatives thereof include: maleic anhydride-modified SEBS, maleic anhydride-modified SEPS, epoxy-modified SEBS, epoxy-modified SEPS. These copolymers can be used alone or in combination with two or more thereof.

Specifically, "Tuftec M" (commodity name) manufactured by Asahi Kasei Chemicals Corporation., "Epofriend" (commodity name) manufactured by Daicel Chemical Industries, Ltd. and so on are commercially available.

Further, a modified polyolefin resin of the above (c) will be described as follows. In the present invention, a modified polyolefin resin being able to constitute the third layer is defined as a resin having a polyolefin as the main component which is modified by unsaturated carboxylic acid or anhydride thereof, or modified by silane coupling agent. Examples of the unsaturated carboxylic acid or anhydride thereof include: an ester compound of the above acid with monoepoxy compound of one selected from a group consisting of acrylic acid, methacrylic acid, maleic acid, maleic anhydride, citraconic acid, citraconic anhydride, itaconic acid, and itaconic anhydride, or derivatives thereof; and a reaction product of acid with a copolymer having groups in the molecule which enable to react with these acids. Further, metal salt of these unsaturated carboxylic acids or anhydride thereof can be used. Among them, maleic anhydride is more preferably used. These copolymers can be used alone or in combination with two or more thereof.

Examples of silane coupling agent include vinyltriethoxysilane, methacryloyl oxytrimethoxysilane, γ-methacryloyl oxypropyl triacetyloxysilane.

In order to produce a modified polyolefin resin, for example, a modified monomer can be copolymerized in advance at a stage when polymer is polymerized; but also, graft copolymerization of the modified monomer can be carried out once polymer is polymerized. In the modification, these modified monomer can be used alone or in combination of two or more thereof, and the content ratio is preferably in the range of 0.1 mass % or more and 5 mass % or less. Among them, a compound of graft modification can be suitably used.

Specifically, "Admer" (commodity name) manufactured by Mitsui Chemicals, Inc., "Modic" (commodity name) manufactured by Mitsubishi Chemical Corporation, and so on can be commercially available.

For the third layer, a copolymer or a resin of the above (a) to (c) can be used alone, or in combination with two or more thereof. In such a case, content ratio of the copolymer or the resin of the above (a) to (c) can be determined depend on the resin constituting the first layer and the second layer.

(Layer Compositions)

A heat-shrinkable laminated film of the first embodiment of the present invention is composed of at least two layers, i.e. the first layer having at least one kind of the above-mentioned PLA series resin as the main component, and the second layer having at least one kind of PO series resin as the main component. While, a heat-shrinkable laminated film of the second embodiment of the invention is composed of the third layer having an adhesive resin as the main component and placed between the first layer and the second layer of a laminated film of the above-mentioned first embodiment. Since the heat-shrinkable laminated film of the invention is the one that is composed of a PO series resin and a PLA series resin both of which refractive index is similar, it is capable to maintain the transparency even when recycled films obtained by trimming loss like heels of films are added as a reclamation material.

In the invention, preferable laminated composition of the film is a three-layer composition of (the first layer)/(the second layer)/(the first layer). It is more preferably a five-layer composition of (the first layer)/(the third layer)/(the second layer)/(the third layer)/(the first layer). By adopting this layer composition, the heat-shrinkable laminated film exhibits excellent shrinkage property in low temperature which the invention originally intended, film rigidity (stiffness at room temperature), and shrink finishing quality; it also exhibits a small natural shrinkage with suppressed film interlayer peeling; and it is applicable to shrinkable packing, shrinkable bond-packing, shrinkable label and the like in productive and economical way.

Continuously, preferable embodiments of the present invention, a film having three-layer composition of (the first layer)/(the second layer)/(the first layer) and a film having five-layer composition of (the first layer)/(the third layer)/(the second layer)/(the third layer)/(the first layer) will be described.

Thickness ratio of each layer may be set based on the above-mentioned effects, it is not particularly limited. The thickness ratio of the first layer is, to the thickness of the entire laminated film (100%), preferably 10% or more, more preferably 20% or more, and preferably 80% or less, more preferably 70% or less. The thickness ratio of the second layer is, to the thickness of the entire laminated film (100%), preferably 20% or more, more preferably 30% or more, and preferably 90% or less, more preferably 80% or less.

When the third layer is placed between the first layer and the second layer, because of the function of the third layer, the thickness is preferably 0.5 μm or more, more preferably 0.75 μm or more, furthermore preferably 1 μm or more. It is also preferably 6 μm or less, more preferably 5 μm or less.

When each of the thickness ratio is within the above range, it is capable to obtain a heat-shrinkable laminated film which exhibits excellent shrinkage property in low temperature, film rigidity (stiffness at room temperature), and shrink finishing quality; it also exhibits a small natural shrinkage with suppressed film interlayer peeling; and it is applicable to shrinkable packing, shrinkable bond-packing, shrinkable label and the like.

The total film thickness of the present invention is not particularly limited. However, from the viewpoint of transparency, shrink workability, material cost, and so on, thinner film is preferable. Specifically, the total film thickness after elongation is preferably 80 μm or less, more preferably 70 μm or less, further preferably 50 μm or less, and furthermore preferably 40 μm or less. While, the lower limit of the total film thickness is not particularly limited, however, from the viewpoint of film handling, it is preferably 10 μm or more.

(Physical Properties)

(1) Heat Shrinkage Ratio

The important point of a film of the present invention is that heat shrinkage ratio of the film when dipped in warm water of 80° C. for 10 seconds is 30% or more at least in one direction. This heat shrinkage ratio is an index to judge adaptability of the film for shrink workability into shrinkable label of PET bottles or the like in relatively short time (a few seconds to a dozen seconds). For example, necessary shrinkage ratio required of the heat-shrinkable film to be used for shrinkable label of PET bottles is, though it varies depend on the shape of the bottles, in general, 20% or more and 70% or less.

An industrially most popular heat shrink machine for labeling of PET bottles these days is the so-called "steam-shrinker" using steam as an heating medium for shrinkage process. The heat-shrinkable film, from the viewpoint of influence of heat to the object to be lapped, needs to be sufficiently heat-shrunk at as low temperature as possible.

Considering such industrial productivity, if heat shrinkage ratio of the film in the above condition is 30% or more, the film is capable to sufficiently fit the object to be lapped within the shrinkage processing time, thereby it is preferable. From this point, heat shrinkage ratio of the film when dipped in warm water of 80° C. for 10 seconds is, at least in one direction, usually in the main shrinking direction, 30% or more, preferably 35% or more, furthermore preferably 40% or more, and 70% or less, preferably 65% or less, furthermore preferably 60% or less.

In this description, "main shrinking direction" means a direction of larger heat shrinkage ratio in film longitudinal direction or crosswise direction (width direction). For example, when the film is fitted onto a bottle, it is a direction equivalent to outer circumferential direction of the bottle. While, "a direction perpendicular to" means a direction perpendicular to the main shrinking direction. Also, in the embodiment of this description, a drawing (flow) direction of the laminated film and a perpendicular direction thereto are respectively correspond with "a direction perpendicular to" and "main shrinking direction".

If a film of the invention is used as a heat-shrinkable laminated film, when the film is dipped in warm water of 80° C. for 10 seconds, heat shrinkage ratio in the perpendicular direction is preferably 10% or less, more preferably 5% or less, furthermore preferably 3% or less. When the film has 10% or less of heat shrinkage ratio in the perpendicular direction, it is preferable because troubles such that a dimension in the perpendicular direction to the film's main shrinking direction after shrinkage becomes shorter, printed images and letters on the film become easily deformed after shrinkage, and vertical sink marks can be found particularly in the film of prismatic shape bottles are hardly found.

In the film of the invention, heat shrinkage ratio of the film when dipped in warm water of 70° C. for 10 seconds is, in the film's main shrinking direction, 5% or more, preferably 7% or more, furthermore preferably 10% or more, and less than 50%, preferably 45% or less, furthermore preferably 40% or less. When the lower limit of the heat shrinkage ratio at 70° C. in the film's main shrinking direction is 5%, at a time of bottle fitting by a steam-shrinker, it is capable to inhibit locally produced shrinkage unevenness and eventually inhibit production of wrinkles and pocks. By limiting the upper limit of heat shrinkage ratio to less than 50%, the film is capable to inhibit an extreme shrinkage at a lower temperature, for instance, it is capable to maintain the small natural shrinkage even under the high-temperature condition in summer season.

When the film is dipped in warm water of 70° C. for 10 seconds, the heat shrinkage ratio in a direction perpendicular to the film is preferably 10% or less, more preferably 5% or less, furthermore preferably 3% or less. When the film has 10% or less of heat shrinkage ratio in the perpendicular direction to the main shrinking direction, it is preferable because troubles such that a dimension in the perpendicular direction to the film's main shrinking direction after shrinkage becomes shorter, printed images and letters on the film become easily deformed after shrinkage, and vertical sink marks can be found particularly in the film of prismatic shape bottles are hardly found.

In the film of the invention, in order to adjust heat shrinkage ratio of the film when dipped in warm water of 70° C. and 80° C. for 10 seconds respectively, it is preferable to adjust the resin composition in accordance with the stipulation of the present invention but also to adjust the elongation temperature within the range described as follows. For example, in order to increase heat shrinkage ratio in the main shrinkage direction, various means such as raising the thickness ratio of the first layer and elongation ratio, and lowering the elongation temperature can be taken.

(2) Natural Shrinkage Ratio

In the film of the present invention, the natural shrinkage ratio is preferably as small as possible. In general, natural shrinkage ratio of a heat-shrinkable film, for example, after 30 days storage under an environment of 30° C. and 50% RH, is desirably less than 3.0%, preferably 2.0% or less, more preferably 1.5% or less. If natural shrinkage ratio in the above condition is less than 3.0%, even though such produced film is stored over the long period, it can be stably fitted to containers and so on and hardly cause any problems.

In the film of the invention, as the means to adjust natural shrinkage ratio of the film, it is primarily important to set resin compositions of each layer within the range defined in the invention, but also it is adjustable by particularly increasing and decreasing the thickness ratio of the first layer to the thickness of the entire film.

(3) Haze

As transparency of a film of the present invention including a film to which recycled film is added, for the use where transparency is required (for example, a use of film of which back surface has a printing surface that is required to be seen from the front surface of the film), when 50 μm thickness film is measured in accordance with JIS K7105, haze is preferably 10% or less, more preferably 7% or less, furthermore preferably 5% or less. When haze thereof is 10% or less, transparency of film can be obtained, thereby display effect can be provided.

(4) Storage Elastic Modulus (E')

In the present invention, when dynamic viscoelasticity is measured in a direction perpendicular to the film's main elongation direction under a condition of vibrational frequency 10 Hz, distortion 0.1%, rate of temperature increase 2° C./min, distance between chucks 2.5 cm, and measurement temperature −150° C.~150° C., a storage elastic modulus (E') at 20° C. is preferably in the range of 1,200 MPa or more and 3,000 MPa or less, more preferably in the range of 1,200 MPa or more and 2,500 MPa or less. When the storage elastic modulus (E') is 1,200 MPa or more, film rigidity (stiffness in room temperature) as the entire film can be enhanced, the following problems can be hardly seen: the film becomes too soft and is elongated by roll tension at a time of secondary fabrication like printing and bag-making; a thin film is fitted in an oblique state when the film being made as a bag is made fit containers like PET bottles by labeling machine and so on; and yield of the film declines due to the bending of the film. Thus it is preferable. On the other hand, when the storage elastic modulus (E') is 3,000 MPa or less, the film does not become rigid and hard to be elongated. Such film does not have problems like having wrinkles at a time of secondary fabrication and occurrence of rustle feel at a time of use, therefore it is preferable.

In order to have a storage elastic modulus (E') at 20° C. in a direction perpendicular to the film's elongation direction within the range of 1,200 MPa or more and 3,000 MPa or less, it is primarily important to set resin compositions of each layer to the range defined in the invention, but also it is adjustable by particularly changing the thickness ratio of the first layer, the second layer, and the third layer to the thickness of the entire film. For instance, when value of the storage elastic modulus (E') is required to be raised, it can be realized by increasing the thickness ratio of the first layer to the thickness of the entire laminated film and increasing the stiffness of the resins for the second layer.

(5) Rupture Elongation

Impact-resistance of the film of the present invention can be evaluated by rupture elongation. At a tensile test in a temperature of 0° C. with a film particularly in label application, degree of elongation in the drawing (flow) direction is 150% or more, preferably 200% or more, furthermore preferably 250% or more. When the rupture elongation in a temperature of 0° C. is 100% or more, problems like film breakage at a time of printing and bag-making can be hardly seen, thereby it is preferable. Further, with speeding-up of printing and bag-making processes, tensions of the film increases, however, in such a circumstance, the film is hard to be broken if it has rupture elongation of 150% or more. Thus it is preferable.

(6) Strength of Interlayer Peeling

A strength of interlayer peeling (sealing strength) of the film of the invention, when measured according to a measurement method described in examples described below (a method where, under an environment of 23° C. and 50% RH, a T-type peeling method is applied in a TD direction (a main shrinking direction) at a test speed of 200 mm/min to peel), is 2N/15 mm width or more, preferably 4N/15 mm width or more, and more preferably 6N/15 mm width or more. The upper limit of the strength of interlayer peeling is not particularly restricted; however, from the viewpoint of solvent resistance of a film surface, it is preferably 15N/15 mm width or less. The film of the invention has at least 2N/15 mm width of strength of interlayer peeling; therefore it has few troubles like peeling of sealed portion at a time of use. As a means to secure the strength of interlayer peeling of the above film, it is primarily important to set the resin compositions of each layer within the range defined in the invention, but also it is important particularly to set the thickness of third layer to 0.5 μm or more and to compose the third layer with resins defined in the invention.

(Manufacturing Method of the Film)

The film of the present invention can be manufactured by use of commonly known methods. A film shape may be any one of a planar shape or a tubular shape. However, from the viewpoint of the productivity (several sets can be obtained as products in a width direction of an original film) and capability of printing on an inner surface, a planar shape is preferred. An example of a manufacturing method of the planar film is as follows: a plurality of extruders is used to melt resins; the melted resin is treated by co-extrusion from a T-die, cooling and solidifying with a chilled roll, roll stretching in a longitudinal direction, and tenter stretching in a crosswise direction in this order; then it is treated by annealing and followed by cooling, (followed by applying the corona treatment when printing is applied); and finally a desired film can be obtained by winding with a winder. Furthermore, a method where a film produced by means of a tubular method is cut and opened into a planar shape can be applied as well.

Elongation magnification for applications of a film to be shrunk in two directions such as overlapping application, is twice or more and 10 times or less in the longitudinal direction, twice or more and 10 times or less in the crosswise direction. It is preferably 3 times or more and 6 times or less in the longitudinal direction and 3 times or more and 6 times or less in the crosswise direction. On the other hand, for applications of a film to be shrunk in mainly one direction such as application of heat-shrinkable label, the elongation magnification is desirably determined so as to be practically within the magnification range of monoaxial elongation such as twice or more and 10 times or less in the direction equivalent to the main shrinking direction, preferably 4 times or more and 8 times or less. It is also same magnification or more and twice or less (same magnification means a case that the film is not elongated.) for the direction perpendicular to the main shrinking direction, preferably 1.1 times or more and 1.5 times or less. When a film is elongated within the range of above elongation magnification so as to obtain the biaxially elongated film, the heat shrinkage ratio of the obtained film in the direction perpendicular to the main shrinking direction does not become too large. It is preferable to be able to inhibit a phenomena the so-called "longitudinal sink-mark phenomena" such that for example when a film is used for a shrinkable label application the film is heat-shrunk around a container even in the height direction.

Elongation temperature needs to be varied depends on the glass transition temperature of used resins and properties required for the heat-shrinkable film. Overall, it is controlled in the range of 50° C. or more, preferably 60° C. or more, and the upper limit is 130° C. or less, preferably 110° C. or less. Also, elongation magnification, in accordance with the properties of resins to be used, means of elongation, elongation temperature, shape of intended products, and soon, is appropriately determined in monoaxial and biaxial directions in the range of 1.5 times or more and 10 times or less in the main shrinking direction, more preferably 3 times or more and 7 times or less, furthermore preferably 3 times or more and 5 times or less. Moreover, even in the case of monoaxial elongation in the crosswise direction, for the purpose of improvement of mechanical properties of the film, it is effective to give a weak elongation in the range around 1.05 times or more and 1.8 times or less in the longitudinal direction. Then, the elongated film, if necessary, for the purpose of reduction of natural shrinkage ratio and improvement of heat shrinkage property, is treated by thermal treatment and relaxation treatment at the temperature around 50° C. or more and 100° C. or less, then is quickly cooled within the time before the molecular orientation is loosening up, so as to obtain the heat-shrinkable laminated film.

In addition, if necessary, the film of the invention can be treated with surface-treatment and surface-processing such as corona discharge treatment, printing, coating, vapor deposition, further treated with bag-making process by various solvent and heat-sealing and perforation-making process.

A film of the invention is provided for packaging application by processing the shape from planar shape into cylindrical shape along the objects to be covered. In case of cylindrical containers such as PET bottles of which outer surface need to be printed, necessary images are printed on one entire surface of a wide-width flat film winded by a roll, the printed film is cut into pieces of film having required width, then a piece of film is folded so as the printed surface thereof to become inner surface of the film, finally center seal (shape of seal portion is the so-called "envelop seams") is made to complete the cylindrical shape. As a method of center sealing, there may be a method of adhesive bonding by organic solvent, a method by heat seal, a method by adhesive, and a method by impulse sealer. Among these, from the viewpoint of productivity and pleasing appearance, a method of adhesive bonding by organic solvent is suitably used.

<A Molded Article, a Heat Shrinkable Label, and a Container>

Since the film of the invention exhibits excellent low-temperature shrinkage, shrink finishing quality, transparency, natural shrinkage and so on, its usage is not particularly limited. If necessary, by forming printed layer, deposited layer and other functional layers, it is suitably used as various molded articles such as bottles (blown bottles), trays, lunch boxes, containers for food of delicatessen, and containers for dairy products. Especially, when the film of the invention is used as heat-shrinkable labels for food containers (for instance, PET bottles for soft drinks or food, glass bottles, preferably PET bottles), the film is capable to adhere to the complex shapes (e.g., cylindrical column, quadrangular prism, pentagonal prism, and hexagonal column respectively having corners, etc.) of containers, thus containers being fitted with labels of pleasing appearance without having wrinkles and pocks can be obtained. The molded articles and containers of the invention can be produced by using conventional molding method.

The film of the invention exhibits excellent low-temperature shrinkage and shrink finishing quality. It is used as a material of heat-shrinkable label for plastic molded articles being deformed by heating at high temperatures, but also it is used as materials of heat-shrinkable label for packaging (containers) using materials as constituent thereof, whose thermal expansion rate and water absorption rate are extremely different from that of the heat-shrinkable film of the invention, for example at least one kind of material selected from a group consisting of: metal, porcelain, glass, paper; polyolefin series resin such as polyethylene, polypropylene, and polybutene; polymethacrylate series resin; polycarbonate series resin; polyester series resin such as polyethylene terephthalate and polybutylene terephthalate; and polyamide series resin, are used as the constituting materials.

Examples of materials constituting plastic molded articles to which the film of the invention can be applicable include not only the above resins, but also polystyrene, rubber-modified high-impact polystyrene (HIPS), styrene-butyl acrylate copolymer, styrene-acrylonitrile copolymer, styrene-maleic anhydride copolymer, acrylonitrile-butadien-styrene copolymer (ABS), methacrylate ester-butadiene-styrene copolymer (MBS), polyvinyl chloride series resin, phenolic resin, urea resin, melamine resin, epoxy resin, unsaturated polyester resin, silicone resin. These plastic packaging may be a mixture of two or more kinds of resins or lamination thereof.

EXAMPLES

The present invention will be described with examples as follows.

Measurement values and evaluation criteria thereof shown in the examples are defined as follows. Here, a drawing (flow) direction of the laminated film is called as longitudinal direction, and a direction perpendicular to the longitudinal direction is called as crosswise direction.

Examples 1~7, Comparative Examples 1 and 2, Reference Examples 1~3

(1) Storage Elastic Modulus (E')

An obtained film was accurately cut into pieces each having a size of 4 mm in width×60 mm in length to make test pieces. The respective test pieces are measured in the longitudinal direction by using viscoelastic spectrometer DVA-200 (produced by IT Measurement Co., Ltd.) under the condition of vibrational frequency 10 Hz, distortion 0.1%, and rate of temperature increase 2° C./min, distance between chucks 2.5 cm, measurement temperature from −150° C. to 150° C. As the storage elastic modulus (E'), a storage elastic modulus at 20° C. is shown.

(2) Heat Shrinkage Ratio

An obtained film was cut into pieces each having a size of 100 mm in length and 100 mm in width, and the pieces are respectively dipped in 70° C. and 80° C. hot-water baths for 10 seconds, then the amount of shrinkage was measured. Heat shrinkage ratio is defined by that a ratio of the shrinkage amount to the original dimension before shrinkage of both in the longitudinal direction and in the crosswise direction and the ratio is shown in % value.

(3) Natural Shrinkage Ratio

A film was cut into pieces each having a size of 100 mm in length and 1000 mm in width, and left them in thermostatic bath under an atmosphere at 30° C. for 30 days. Then, the shrinkage amount to the original dimension before shrinkage in the film's main shrinking direction was measured, and the ratio thereof is shown in % value.

(4) Haze

Haze of the film was measured with a film of 50 μm in thickness in accordance with JIS K7105 and the measurement values were evaluated based on the criteria:

X (no good): 10% or more;
○ (good): 5% or more and less than 10%; and
⊙ (very good): less than 5%.

(5) Interlayer Adhesive Strength

A film was cut into pieces each having a size of 100 mm in length and 298 mm in width. Portions of 10 mm at both ends of the film in crosswise direction are overlapped each other and adhered by tetrahydrofuran (THF) solvent so as to make a cylindrical film. The cylindrical film was fitted with a cylindrical PET bottle whose capacity is 1.5 L, it was come through the steam-heating type shrinkage tunnel of which length is 3.2 m (3 zones) within about 4~8 seconds without rotation. The atmospheric temperature in each zone of the tunnel was set within the range from 70° C. to 85° C. by adjusting the steam flow with flow control valve. After the film coverage, interlayer adhesiveness of the film was observed with eyes and evaluated in line with the following criteria.

◎: when a label is fitted with a bottle, interlayer peeling of the film is not found, moreover, when the label is peeled from the sealed portion, interlayer peeling of the film is not found;

○: when a label is fitted with a bottle, interlayer peeling of the film is not found, however, when the label is peeled from the sealed portion, interlayer peeling of the film is found;

Δ: when a label is fitted with a bottle, interlayer peeling of the film is slightly found at the sealing portion; and X: when a label is fitted with a bottle, interlayer peeling of the film is found at allover the sealing portion.

(6) Shrink Finishing Quality

A film on which grid network with 10 mm interval is printed was cut into a size of 100 mm in length×298 mm in width. Portions of 10 mm at both ends of the film in crosswise direction were overlapped each other and adhered by tetrahydrofuran (THF) solvent so as to make a cylindrical film. The cylindrical film was fitted with a cylindrical PET bottle whose capacity is 1.5 L, it was come through the steam-heating type shrinkage tunnel of which length is 3.2 m (3 zones) within about 4 seconds without rotation. The atmospheric temperature in each zone of the tunnel was set within the range from 70° C. to 85° C. by adjusting the steam flow with flow control valve. After film coverage, shrink finishing quality was evaluated in line with the following criteria.

◎: shrinkage is sufficient and no wrinkle, pock and distortion of the grid network is produced;

○: shrinkage is sufficient, but wrinkles, pocks and distortions of the grid network are slightly produced; and X: shrinkage is sufficient, but wrinkles, pocks and distortions of the grid network are remarkably produced. Or, shrinkage is insufficient thereby coverage of the film to the bottle is insufficient.

Example 1

As shown in Table 1, as a PLA series resin to be used for the first layer, "Nature Works 4060D" (commodity name, L-body: D-body=88:12) manufactured by Nature Works LLC (hereinafter, it is abbreviated as "PLA1".) was used; as a PO series resin to be used for the second layer, a mixed resin composition of 50 mass % of a random PP, "Wintec WFX4T" (commodity name) manufactured by Japan Polyechem Corporation (hereinafter, it is abbreviated as "PO1".) and 50 mass % of linear low-density polyethylene, "Umerit 0540F" (commodity name) manufactured by Ube Industries, Ltd. (hereinafter, it is abbreviated as "PO3".) was used. Materials constituting each layer were fed into the respective monoaxial extruders manufactured by MITSUBISHI HEAVY INDUSTRIES, LTD. and melt-mixed at the set temperature 200° C., co-extrusion by three-layer two-kind dies was conducted so as to have a film whose thickness of each layer is (the first layer)/(the second layer)/(the first layer)=45 μm/160 μm/45 μm. The laminated film was drawn by castroll at 40° C., was cooled and solidified so as to obtain a non-elongated laminated sheet of 300 mm in width and 250 μm in thickness.

Then, with use of film tentering machine manufactured by KYOTO MACHINERY CO., LTD., the laminated film was elongated to 5.0 times in crosswise monoaxial direction at elongation temperature 75° C., and was quickly cooled by cold wind, so as to obtain a heat-shrinkable laminated film in 50 μm thickness. The evaluation results of the obtained film are shown in Table 2.

Example 2

As shown in Table 1, as a PLA series resin to be used for the first layer, a mixed resin having 50 mass % of PLA1 and 50 mass % of "Nature Works 4050D" (commodity name, L-body: D-body=95:5) manufactured by Nature Works LLC (hereinafter, it is abbreviated as "PLA2".) was used; as a PO series resin to be used for the second layer, a mixed resin composition having 80 mass % of PO1 and 20 mass % of polyolefin "TPO 310V" (hereinafter, it is abbreviated as "PO2".) manufactured by Idemitsu Kosan Co., Ltd. was used; and as the third layer, acid-modification polyolefin resin, commodity name "Admer SF731" (hereinafter, it is abbreviated as "AD1".) manufactured by Mitsui Chemicals, Inc. was used. Materials constituting each layer were fed into the respective monoaxial extruders manufactured by MITSUBISHI HEAVY INDUSTRIES, LTD. and melt-mixed at the set temperature 200° C., co-extrusion by five-layer three-kind dies was conducted so as to have a film whose thickness of each layer is (the first layer)/(the third layer)/(the second layer)/(the third layer)/(the first layer)=40 μm/10 μm/150 μm/10 μm/40 μm. The laminated film was drawn by castroll at 40° C., was cooled and solidified so as to obtain a non-elongated laminated sheet of 300 mm in width and 250 μm in thickness. Then, with use of film tentering machine manufactured by KYOTO MACHINERY CO., LTD., the laminated film was elongated to 5.0 times in crosswise monoaxial direction at elongation temperature 75° C., and was quickly cooled by cold wind, so as to obtain a heat-shrinkable laminated film in 50 μm thickness. The evaluation results of the obtained film are shown in Table 2.

Example 3

As shown in Table 1, except for changing resins of the first layer of Example 2 to a mixed resin composition having 90 mass % of PLA1 and 10 mass % of a copolymer of polylactic series resin, diol, and dicarboxylic acid, commodity name "Plamate PD150" (hereinafter, it is abbreviated as "rubber component".) manufactured by Dainippon Ink and Chemicals Incorporated; changing resins of the second layer of Example 2 to a mixed resin having 55 mass % of PO1, 30 mass % of PO2, 15 mass % of hydrogenated petroleum resin, commodity name "Alcon P140" (hereinafter, it is abbreviated as "petroleum resin".) manufactured by Arakawa Chemical Industries, Ltd.; and changing resins of the third layer of Example 2 to acid-modified SEBS, commodity name "Tuftec M1913" (hereinafter, it is abbreviated as "AD2".) manufactured by Asahi Kasei Chemicals Corporation, Example 3 was conducted in the same manner as Example 2 and a heat-shrinkable laminated film was obtained. The evaluation results of the obtained film are shown in Table 2.

Example 4

As shown in Table 1, except for changing resins of the first layer of Example 2 to a mixed resin having 50 mass % of PLA1, 40 mass % of PLA2, and 10 mass % of rubber component; changing resins of the second layer of Example 2 to a mixed resin having 35 mass % of PO1, 40 mass % of PO3, and 25 mass % of petroleum resin; and changing resins of the third layer of Example 2 to ethylene-ethyl acrylate-glycidyl methacrylate copolymer, commodity name "Bond-fast 7M" (hereinafter, it is abbreviated as "AD3".) manufactured by Sumitomo Chemical Co., Ltd, Example 4 was conducted in the same manner as Example 2 and a heat-shrinkable laminated film was obtained. The evaluation results of the obtained film are shown in Table 2.

Example 5

As shown in Table 1, except for changing resins of the third layer of Example 2 to SEBS, commodity name "Tuftec H1221" (hereinafter, it is abbreviated as "AD4".) manufactured by Asahi Kasei Chemicals Corporation., Example 5 was conducted in the same manner as Example 2 and a heat-shrinkable laminated film was obtained. The evaluation results of the obtained film are shown in Table 2.

Example 6

As shown in Table 1, except for changing resins of the second layer of Example 1 to an ethylene-vinyl acetate copolymer, commodity name "Novatec EVA LV141" (hereinafter, it is abbreviated as "PO4".) manufactured by Japan polyethylene Corporation, Example 6 was conducted in the same manner as Example 1 and a heat-shrinkable laminated film was obtained. The evaluation results of the obtained film are shown in Table 2.

Example 7

As shown in Table 1, except for changing resins of the second layer of Example 3 to a mixed resin having 45 mass % of PO1, 30 mass % of PO2, 15 mass % of petroleum resin, and 10 mass % of PLA1, Example 7 was conducted in the same manner as Example 2 and a heat-shrinkable laminated film was obtained. The evaluation results of the obtained film are shown in Table 2.

Comparative Example 1

As shown in Table 1, except for producing a non-elongated single sheet composing of only the first layer made of PLA1 so as the thickness to become 250 μm without having the second layer, Comparative example 1 was conducted in the same manner as Example 1 and a heat-shrinkable laminated film was obtained. The evaluation results of the obtained film are shown in Table 2.

Comparative Example 2

As shown in Table 1, except for producing a non-elongated single sheet composing made from 80 mass % of P01 and 20 mass % of PO3 and having thickness of 250 μm without having the first layer, Comparative example 1 was conducted in the same manner as Example 1 and a heat-shrinkable laminated film was obtained. The evaluation results of the obtained film are shown in Table 2. It is noted that when both ends of the film were adhered each other by tetrahydrofuran (THF) solvent so as to make a cylindrical film, solvent sealing property was not good, thereby bag-making of the film in cylindrical shape could not be done.

Reference Example 1

As shown in Table 1, except for changing thickness of each layer of the non-elongated laminated sheet in Example 1 (whose resin of the first layer was changed to P01 and resin of the second layer was changed to PLA1) into (the first layer)/(the second layer)/(the first layer)=80 μm/90 μm/80 μm, Reference example 1 was conducted in the same manner as Example 1 and a heat-shrinkable laminated film was obtained. The evaluation results of the obtained film are shown in Table 2. However, when both ends of the film were adhered each other by tetrahydrofuran (THF) solvent so as to make a cylindrical film, solvent sealing property was not good, thereby bag-making of the film in cylindrical shape could not be done.

Reference Example 2

As shown in Table 1, except for changing resins of the second layer to a mixed resin composition having 50 mass % of PO1 and 50 mass % of PO2 as a PO series resin, and changing thickness of each layer of the non-elongated laminated sheet into (the first layer)/(the second layer)/(the first layer)=105 μm/40 μm/105 μm, Reference example 2 was conducted in the same manner as Example 1 and a heat-shrinkable laminated film was obtained. The evaluation results of the obtained film are shown in Table 2.

Reference Example 3

As shown in Table 1, except for changing resins of the second layer to a mixed resin composition having 50 mass % of PO1 and 50 mass % of PO2 as a PO series resin, and changing thickness of each layer of the non-elongated laminated sheet into (the first layer)/(the second layer)/(the first layer)=10 μm/230 μm/10 μm, Reference example 3 was conducted in the same manner as Example 1 and a heat-shrinkable laminated film was obtained. The evaluation results of the obtained film are shown in Table 2.

TABLE 1

| | Layer composition | Example 1 | Example 2 | Example 3 | Example 4 | Example 5 | Example 6 | Example 7 | Comparative example 1 | Comparative example 2 | Reference example 1 | Reference example 2 | Reference example 3 |
|---|---|---|---|---|---|---|---|---|---|---|---|---|---|
| The first layer | PLA1 (mass %) | 100 | 50 | 90 | 50 | 50 | 100 | 90 | 100 | — | — | 100 | 100 |
| | PLA2 (mass %) | — | 50 | — | 40 | 50 | — | — | — | — | — | — | — |
| | Rubber (mass %) | — | — | 10 | 10 | — | — | 10 | — | — | — | — | — |
| | PO1 (mass %) | — | — | — | — | — | — | — | — | — | 100 | — | — |

TABLE 1-continued

| Layer composition | | Example 1 | Example 2 | Example 3 | Example 4 | Example 5 | Example 6 | Example 7 | Comparative example 1 | Comparative example 2 | Reference example 1 | Reference example 2 | Reference example 3 |
|---|---|---|---|---|---|---|---|---|---|---|---|---|---|
| The second layer | PO1 (mass %) | 50 | 80 | 55 | 35 | 80 | — | 45 | — | 80 | — | 50 | 50 |
| | PO2 (mass %) | — | 20 | 30 | — | 20 | — | 30 | — | — | — | 50 | 50 |
| | PO3 (mass %) | 50 | — | — | 40 | — | — | — | — | 20 | — | — | — |
| | PO4 (mass %) | — | — | — | — | — | 100 | — | — | — | — | — | — |
| | Petroleum resin (mass %) | — | — | 15 | 25 | — | — | 15 | — | — | — | — | — |
| | PLA1 (mass %) | — | — | — | — | — | — | 10 | — | — | 100 | — | — |
| The third layer | AD1 (mass %) | — | 100 | — | — | — | — | — | — | — | — | — | — |
| | AD2 (mass %) | — | — | 100 | — | — | — | 100 | — | — | — | — | — |
| | AD3 (mass %) | — | — | — | 100 | — | — | — | — | — | — | — | — |
| | AD4 (mass %) | — | — | — | — | 100 | — | — | — | — | — | — | — |
| Thickness ratio of front-back layers (%) | | 32 | 28 | 28 | 28 | 28 | 32 | 28 | — | — | — | 84 | 8 |

TABLE 2

| Evaluation items | Example 1 | Example 2 | Example 3 | Example 4 | Example 5 | Example 6 | Example 7 | Comparative example 1 | Comparative example 2 | Reference example 1 | Reference example 2 | Reference example 3 |
|---|---|---|---|---|---|---|---|---|---|---|---|---|
| Storage elastic modulus (MPa) | 1540 | 1350 | 1382 | 1365 | 1302 | 1272 | 1401 | 3000 | 1050 | 1532 | 2525 | 1010 |
| Shrinkage ratio (70° C.) (%) | 28 | 25 | 28 | 32 | 24 | 30 | 27 | 72 | 12 | 25 | 48 | 18 |
| Shrinkage ratio (80° C.) (%) | 39 | 37 | 42 | 46 | 38 | 44 | 43 | 78 | 15 | 37 | 62 | 24 |
| Natural shrinkage ratio (%) | 0.7 | 0.8 | 0.5 | 0.4 | 0.8 | 0.5 | 0.6 | 0.3 | 5.2 | 0.5 | 0.4 | 3 |
| Haze (%) | ◎ | ◎ | ◎ | ◎ | ◎ | ◎ | ◎ | ◎ | ◎ | ○ | ◎ | ◎ |
| Interlayer adhesive strength | ○ | ◎ | ◎ | ◎ | ◎ | ○ | ◎ | — | Unable to evaluate as bag-making is impossible. | Unable to evaluate as bag-making is impossible. | Δ | Δ |
| Shrink finishing quality | ◎ | ◎ | ◎ | ◎ | ◎ | ◎ | ◎ | X | | | ○ | ○ |

According to Table 2, the films of the Examples constituted to meet the range defined in the present invention exhibit equivalent to or better performance of film rigidity (storage elastic modulus of a laminated film), shrinkage property in low temperature, natural shrinkage, interlayer adhesiveness, and shrink finishing quality than those of Comparative examples 1 and 2.

On the other hand, a film which did not have the second layer and the third layer (Comparative example 1) showed remarkably high shrinkage at 70° C., therefore it lacks shrink finishing quality. Also, a film which did not contain a PLA series resin in the first layer (Comparative example 2) lacks film rigidity, heat shrinkage ratio, and natural shrinkage ratio. Further, a film which was composed of the second layer with a PLA series resin and the first layer with a PO series resin (Reference example 1) had a bad solvent sealing property; thereby bag-making could not be completed.

Moreover, a film of which first layer was thick (Reference example 2) showed high heat shrinkage ratio, and the shrink finishing quality thereof was slightly inferior to that of films of Examples. While, a film of which first layer was thin (Reference example 3) showed larger natural shrinkage ratio, and the film rigidity and shrink finishing quality thereof were slightly inferior to those of films of Examples.

As seen from above, a heat-shrinkable laminated film of the present invention is understood that the film exhibits excellent shrinkage property in low temperature, film rigidity (stiffness at room temperature), shrink finishing quality, it has small natural shrinkage ratio and the interlayer peeling of the film is inhibited; therefore it is suitably used for shrinkable packing, shrinkable bond-packing, and shrinkable label.

Examples 8~11, Comparative Examples 3~5, Reference Example 4

Evaluation method for the Examples and so on will be shown below. The evaluation method of "natural shrinkage ratio" and "shrink finishing quality" are the same as that previously described.

(1) Heat Shrinkage Ratio

An obtained film was cut into pieces each having a size of 100 mm in length and 100 mm in width, and the pieces are respectively dipped in 70° C., 80° C., and 90° C. hot-water baths for 10 seconds, then the amount of shrinkage was measured. Heat shrinkage ratio is defined by that a ratio of the shrinkage amount to the original dimension before shrinkage of both in the length direction and in the width direction. The ratio is shown in % value.

(2) Tensile Elastic Modulus

In accordance with JIS K7127, at a temperature of 23° C., tensile elastic modulus of a film in a direction (longitudinal direction) perpendicular to the film's main shrinking direction was measured.

(3) Haze

In accordance with JIS K7105, haze of a film of which thickness is 40 µm was measured.

(4) Low-temperature Rupture Elongation

In accordance with JIS K7127, rupture elongation of a film in a direction (longitudinal direction) perpendicular to the film's main shrinking direction was measured under the condition of temperature at 0° C., testing rate 100 mm/min.

(5) Interlayer Peeling Strength

At positions 10 mm inside from the both ends in crosswise direction of the film, a mixed solvent composed of 90 mass % of THF and 10 mass % of n-hexane was applied to the positions and the end portions of the film were adhered each other so as to make a cylindrical label. The sealed portion was cut into the 5 mm width in the direction perpendicular to the circumference direction. By using this, peeling test was conducted in the tensile testing machine with thermostatic bath ("201X" manufactured by INTESCO, CO., Ltd). The measured strength of interlayer peeling was evaluated based on the following criteria.

⊚ (very good): interlayer peeling strength is 6N/15 mm width or more;

○ (good): interlayer peeling strength is 4N/15 mm width or more and below 6N/15 mm width; and X (bad): interlayer peeling strength is below 2N/15 mm width.

(6) Haze of Recycled Film

The obtained heat shrinkable film was pulverized by pulverizer and made into recycled pellet. After that, a certain amount of the pellet equivalent to 30 parts by mass to 100 parts by mass of the resin constituting the second layer was added to the second layer so as to obtain recycled films in a same manner as other individual examples. With use of the obtained recycled films of 40 µm in thickness, haze was measured in accordance with JIS K7105. Results were evaluated in line with the following criteria also shown in the table.

⊚: haze is below 7%;

○: haze is 7% or more and below 10%; and

X: haze is 10% or more.

Example 8

As shown in Table 3, a mixed resin having 70 mass % of PLA1, 20 mass % of PLA2, and 10 mass % of acrylic rubber, commodity name "Metablen S2001" (hereinafter, it is abbreviated as "acrylic rubber".) manufactured by Mitsubishi Rayon Co., Ltd. was used as the first layer; a mixed resin having 50 mass % of random polypropylene resin, commodity name "WINTEC WFX6" (propylene/ethylene=97/3, MFR 2.0 g/10 min, melting point 125° C., density 0.90 g/cm³) (hereinafter, it is abbreviated as "PP".), 50 mass % of polyethylene resin, commodity name "Karnel KF360" (MFR 3.5 g/10 min, melting point 97° C., density 0.898 g/cm³) (hereinafter, it is abbreviated as "PE".) manufactured by Mitsubishi Chemical Corporation, 20 mass % of petroleum resin, and 10 mass % of flexible olefin resin, commodity name "IDEMITSU TPO T310E" (MFR 1.5 g/10 min, Vicat softening point 97° C.) (hereinafter, it is abbreviated as "TPO".) manufactured by Idemitsu Kosan Co., Ltd. was used as the second layer; and an ethylene-vinyl acetate copolymer, commodity name "Evaflex EV40LX" (ethylene content 78 mole %, MFR 2.5 g/10 min) (hereinafter, it is abbreviated as "EVA".) manufactured by Du Pont-Mitsui Polychemicals Co., Ltd as the third layer was used. These resins constituting each layer were respectively fed into the respective monoaxial extruders manufactured by MITSUBISHI HEAVY INDUSTRIES, LTD. and melt-mixed at the set temperature 230° C., co-extrusion by five-layer three-kind dies was conducted so as to have a film whose thickness of each layer is (the first layer)/(the third layer)/(the second layer)/(the third layer)/(the first layer)=30 µm/10 µm/120 µm/10 µm/30 µm. The laminated film was drawn by castroll at 50° C., was cooled and solidified so as to obtain a non-elongated laminated sheet of 300 mm in width and 200 µm in thickness. Then, with use of film tentering machine manufactured by KYOTO MACHINERY CO., LTD., the laminated film was elongated to 5.3 times in crosswise monoaxial direction at preheating temperature 80° C., elongation temperature 75° C., and was treated by relaxation treatment at the temperature 83° C. so as to obtain a heat-shrinkable laminated film in 40 µm thickness. The film was comprehensively evaluated based on the following criteria:

⊚: a film with which all evaluation items are ⊚;

○: a film with which some ○ of evaluation signs are included; and

X: a film with which at least one X is included. The evaluation results of the obtained film are shown in Table 4.

Example 9

As shown in Table 3, in Example 8, except for changing resin composition ratio of the first layer to 50 mass % of PLA1, 35 mass % of PLA2, and 15 mass % of acrylic rubber; changing EVA for the third layer to an acid modified resin SEBS, commodity name "Tuftec M1913" (hereinafter, it is abbreviated as "SEBS".) manufactured by Asahi Kasei Chemicals Corporation.; and changing resin composition ratio of the second layer to 45 mass % of PP, 30 mass % of PE, 15 mass % of petroleum resin, and 10 mass % of TPO, Example 9 was conducted in the same manner as Example 8 and a heat-shrinkable laminated film was obtained. The evaluation results of the obtained film are shown in Table 4.

Example 10

As shown in Table 3, in Example 8, except for changing resin composition ratio of the first layer to 50 mass % of PLA1, 40 mass % of PLA2, and 10 mass % of EVA; changing EVA for the third layer to a modified polyolefin resin, commodity name "Admer SE800" (hereinafter, it is abbreviated as "modified PO".) manufactured by Mitsui Chemicals, Inc.; and changing resin composition ratio of the second layer to 45 mass % of PP, 20 mass % of PE, 25 mass % of petroleum resin, and 10 mass % of TPO, Example 10 was conducted in the same manner as Example 8 and a heat-shrinkable laminated film was obtained. The evaluation results of the obtained film are shown in Table 4.

Example 11

As shown in Table 3, in Example 8, except for changing EVA for the third layer to an ethylene-ethyl acrylate copolymer, commodity name "Evaflex EEA A703" (ethylene content 91 mole %, MFR 5 g/10 min) (hereinafter, it is abbreviated as "EEA".) manufactured by Du Pont-Mitsui Polychemicals Co., Ltd.; and changing resin composition ratio of the second layer to 50 mass % of PP, 30 mass % of petroleum resin, and 20 mass % of TPO, Example 11 was conducted in the same manner as Example 8 and a heat-shrinkable laminated film was obtained. The evaluation results of the obtained film are shown in Table 4.

Comparative Example 3

As shown in Table 3, in Example 8, except for having 200 μm thick non-elongated second layer only without having the first layer and the third layer, Comparative example 3 was conducted in the same manner as Example 8 and a heat-shrinkable laminated film was obtained.

Comparative Example 4

As shown in Table 3, in Example 8, except for changing a mixed resin constituting the first layer to a simple substance of cyclic olefin resin (copolymer), commodity name "Apel 8008T" manufactured by Mitsui Chemicals, Inc. (hereinafter, it is abbreviated as "COC".), Comparative example 4 was conducted in the same manner as Example 8 and a heat-shrinkable laminated film was obtained. The evaluation results of the obtained film are shown in Table 4.

Comparative Example 5

As shown in Table 3, in Example 8, except for changing the mixed resin constituting the first layer to a simple substance of copolymer polyester resin, commodity name "copolyester 6763" manufactured by Eastman Chemical Company (hereinafter, it is abbreviated as "PETG".), Comparative example 5 was conducted in the same manner as Example 8 and a heat-shrinkable laminated film was obtained. The evaluation results of the obtained film are shown in Table 4.

Reference Example 4

As shown in Table 3, in Example 8, except for setting the composition ratio of the first layer to 90 mass % of PLA1 and 10 mass % of acrylic rubber, without having the third layer, and setting the thickness of each layer of the non-elongation laminated sheet to (the first layer)/(the second layer)/(the first layer)=30 μm/140 μm/30 μm, Reference example 4 was conducted in the same manner as Example 8 and a heat-shrinkable laminated film was obtained. The evaluation results of the obtained film are shown in Table 4. At the rupture elongation measurement in low temperature, interlayer peeling occurred.

TABLE 3

|  |  | Example | | | | Comparative Example | | | Reference Example |
|---|---|---|---|---|---|---|---|---|---|
|  |  | 8 | 9 | 10 | 11 | 3 | 4 | 5 | 4 |
| The first layer (mass %) | PLA1 | 70 | 50 | 50 | 70 | — |  |  | 90 |
|  | PLA2 | 20 | 35 | 40 | 20 |  |  |  |  |
|  | COC |  |  |  |  |  | 100 |  |  |
|  | PETG |  |  |  |  |  |  | 100 |  |
|  | Acrylic rubber | 10 | 15 |  | 10 |  |  |  | 10 |
|  | EVA |  |  | 10 |  |  |  |  |  |
| The third layer (mass %) | EVA | 100 |  |  |  | — | 100 | 100 | — |
|  | SEBS |  | 100 |  |  |  |  |  |  |
|  | Modified PO |  |  | 100 |  |  |  |  |  |
|  | EEA |  |  |  | 100 |  |  |  |  |
| The second layer (mass %) | PP | 50 | 45 | 45 | 50 | 50 | 50 | 50 | 50 |
|  | PE | 20 | 30 | 20 |  | 20 | 20 | 20 | 20 |
|  | Petroleum resin | 20 | 15 | 25 | 30 | 20 | 20 | 20 | 20 |
|  | TPO | 10 | 10 | 10 | 20 | 10 | 10 | 10 | 10 |

TABLE 4

|  |  | Example | | | | Comparative Example | | | Reference Example |
|---|---|---|---|---|---|---|---|---|---|
|  |  | 8 | 9 | 10 | 11 | 3 | 4 | 5 | 4 |
| Heat shrinkage ratio (%) | 70° C. | 9 | 9 | 8 | 9 | 8 | 12 | 10 | 8 |
|  | 80° C. | 36 | 39 | 35 | 35 | 22 | 29 | 37 | 38 |
|  | 90° C. | 54 | 56 | 53 | 54 | 36 | 48 | 54 | 53 |
| Natural shrinkage ratio (%) |  | 1.2 | 1.1 | 1.3 | 1.3 | 6.2 | 3.3 | 1.2 | 1.4 |
| Tensile elastic modulus (MPa) |  | 1432 | 1364 | 1435 | 1632 | 1143 | 1432 | 1542 | 1467 |
| Haze (%) |  | 4.6 | 4.3 | 4.8 | 4.4 | 2.0 | 3.3 | 3.0 | 4.0 |
| Low-temperature rupture elongation (%) |  | 246 | 253 | 224 | 201 | 423 | 263 | 343 | Interlayer peeling |
| Interlayer adhesive strength |  | ◎ | ◎ | ○ | ○ | ◎ | ◎ | ◎ | X |
| Shrink finishing quality |  | ◎ | ○ | ◎ | ○ | ◎ | X | X | ◎ |
| Haze of recycled film |  | 6.4 | 6.9 | 7.6 | 7.2 | — | 5.8 | 14.3 | 6.7 |
|  |  | ◎ | ◎ | ○ | ○ |  | ◎ | X | ◎ |
| Comprehensive evaluation |  | ◎ | ◎ | ○ | ○ | X | X | X | X |

As seen from Tables 3 and 4, the films of Examples 8~11 constituted by layers defined by the range of present invention exhibit superior film rigidity (elongation modulus of the laminated film), heat shrinkage ratio, natural shrinkage ratio, interlayer peeling strength, and transparency of film after addition of the recycled film to those of films in Comparative examples 3~5; moreover, shrink finishing quality of Examples 8~11 is also excellent compared with those of Comparative examples 3~5. On the other hand, when a laminated film does not have the first layer (a case of Comparative example 3), the film lacks heat shrinkage property and natural shrinkage property. Also, a film of which first layer is constituted by a resin other than one defined in the invention (in cases of Comparative examples 4 and 5), such films lack natural shrinkage property or transparency at a time of addition as a reclamation material. Further, when a film does not have the third layer (a case of Reference example 4), sufficient interlayer peeling strength cannot be obtained, interlayer peeling occurred during the test. Thus, it is understood that the film of the present invention exhibit excellent heat shrinkage property, small natural shrinkage, and transparency with addition of the recycled film; and the film is a heat-shrinkable laminated film suitably used for shrinkable packing, shrinkable bond-packing, shrinkable label, and so on.

Examples 12~15, Comparative Examples 6~8

Evaluation method of examples of the invention will be shown as follows. The evaluation method of "heat shrinkage ratio", "natural shrinkage ratio", "haze" and "shrink finishing quality" are the same as that described in Example 1. Also, with respect to "storage elastic modulus (E')", except for changing the rate of temperature increase from "2° C./min" to "3° C./min", the evaluation method is same as the one described in Example 1.

(1) Interlayer Peeling Strength

The obtained film was cut into pieces each having a size of 100 mm in length×298 mm in width to make test pieces. Portions of 10 mm at both ends of the film in crosswise direction were overlapped each other and adhered by tetrahydrofuran (THF) solvent so as to make a cylindrical film. The cylindrical film was fitted with a cylindrical PET bottle whose capacity is 1.5 L, it was come through the steam-heating type shrinkage tunnel of which length is 3.2 m (3 zones) within about 4 seconds without rotation. The atmospheric temperature in each zone of the tunnel was set within the range of 70° C. or more and 85° C. or less by adjusting the steam flow with flow control valve. After the film coverage, interlayer adhesiveness of the film was observed with eyes and evaluated in line with the following criteria.

◎: when a label is fitted with a bottle, no interlayer peeling of the film is found;

○: when a label is fitted with a bottle, interlayer peeling of the film is slightly found at the sealing portion; and X: when a label is fitted with a bottle, interlayer peeling of the film is found at allover the sealing portion.

Example 12

As shown in Table 5, as a PLA series resin constituting the first layer, PLA1 was used; as a PO series resin constituting the second layer, 50 parts by mass of a random PP, "Noblen FH3315" (hereinafter, it is abbreviated as "PO5".) manufactured by Sumitomo Chemical Co., Ltd., and 35 parts by mass of linear low-density polyethylene, "UMERIT 0540F" (hereinafter, it is abbreviated as "PO6".) manufactured by Ube Industries, Ltd., 15 parts by mass of hydrogenated petroleum resin "Alcon P125" (hereinafter, it is abbreviated as "PO7".) manufactured by Arakawa Chemical Industries, Ltd.; and as a PLA series resin constituting the same, 10 parts by mass of the same "PLA1" as the first layer were respectively used. Materials constituting each layer were fed into the respective monoaxial extruders manufactured by MITSUBISHI HEAVY INDUSTRIES, LTD. and melt-mixed at the set temperature 200° C., co-extrusion by three-layer two-kind dies was conducted, drawn by castroll at 40° C., and cooled and solidified so as to obtain a non-elongated laminated sheet of 300 mm in width and 250 µm in thickness (layer composition: the first layer/the second layer/the first layer). Then, with use of film tentering machine produced by KYOTO MACHINERY CO., LTD., the laminated film was elongated to 5.0 times in crosswise monoaxial direction at preheat temperature 105° C. and elongation temperature 75° C. Later, the elongated film was quickly cooled and finally the heat-shrinkable laminated film of thickness 50 µm was obtained. The evaluation results of the obtained film are shown in Table 6.

Example 13

As shown in Table 5, except for changing resin composition constituting the second layer to 50 parts by mass of "PO5", 35 parts by mass of "PO6", 15 parts by mass of "PO7", and 5 parts by mass of "PLA1", Example 13 was conducted in the same manner as Example 12 and a heat-shrinkable laminated film was obtained. The evaluation results of the obtained film are shown in Table 6.

Example 14

As shown in Table 5, as a PLA series resin constituting the first layer, 50 parts by mass of "PLA1" and 50 parts by mass of "PLA2" were used; as PO series resins constituting the second layer, a mixed resin composition having a PO series resin containing 50 parts by mass of "PO5" and 50 parts by mass of "PO6", a PLA series resin containing 10 parts by mass of "PLA1", as an adhesive resin, a modified styrene series resin containing 5 parts by mass of "Dynaron 8630P" (hereinafter, it is abbreviated as "AD5".) manufactured by JSR Corporation were used; as an adhesive resin constituting the third layer, 100 parts by mass of "AD5" was used. Materials constituting each layer were fed into the respective monoaxial extruders manufactured by MITSUBISHI HEAVY INDUSTRIES, LTD. and melt-mixed at the set temperature 200° C., co-extrusion by five-layer three-kind dies was conducted so as to obtain a non-elongated laminated sheet (layer composition: the first layer/the third layer/the second layer/the third layer/the first layer). Then, with use of film tentering machine produced by KYOTO MACHINERY CO., LTD., the laminated film was elongated to 5.0 times in crosswise monoaxial direction at preheat temperature 105° C. and elongation temperature 75° C. Later, the elongated film was quickly cooled and finally the heat-shrinkable laminated film of thickness 50 µm was obtained. The evaluation results of the obtained film are shown in Table 6.

Example 15

As shown in Table 5, except for changing resin composition constituting the first layer to 80 parts by mass of "PLA1"

and 20 parts by mass of "PLA2"; changing resin composition constituting the second layer to 50 parts by mass of "PO5", 35 parts by mass of "PO6", 15 parts by mass of "PO7", 10 parts by mass of "PLA1", 10 parts by mass of "PLA2", and 5 parts by mass of "AD5"; and changing thickness ratio of each layer, Example 15 was conducted in the same manner as Example 14 and a heat-shrinkable laminated film (layer composition: the first layer/the third layer/the second layer/the third layer/the first layer) was obtained. The evaluation results of the obtained film are shown in Table 6.

Comparative Example 6

As shown in Table 5, except for changing a resin composition constituting the first layer to 100 parts by mass of "PETG", and changing a resin composition constituting the second layer to 50 parts by mass of "PO5", 35 parts by mass of "PO6", 15 parts by mass of "PO7", and 20 parts by mass of "PETG", Example 16 was conducted in the same manner as Example 14 and a heat-shrinkable laminated film was obtained. The evaluation results of the obtained film are shown in Table 6.

Comparative Example 7

As shown in Table 5, without providing the second layer, a non-elongated single layer sheet constituted by 50 parts by mass of "PLA1" and 50 parts by mass of "PLA2" was obtained in size of 300 mm in width and 250 μm in thickness. Then, with use of film tentering machine produced by KYOTO MACHINERY CO., LTD., the laminated film was elongated to 5.0 times in crosswise monoaxial direction at preheat temperature 105° C. and elongation temperature 75° C. Later, the elongated film was quickly cooled and finally the heat-shrinkable laminated film of thickness 50 μm was obtained. The evaluation results of the obtained film are shown in Table 6.

Comparative Example 8

As shown in Table 5, without providing the first layer, a non-elongated single layer sheet constituted by 50 parts by mass of "PO5", 35 parts by mass of "PO6", and 15 parts by mass of "PO7" was obtained in size of 300 mm in width and 250 μm in thickness. Then, with use of film tentering machine produced by KYOTO MACHINERY CO., LTD., the laminated film was elongated to 5.0 times in crosswise monoaxial direction at preheat temperature 105° C. and elongation temperature 75° C. Later, the elongated film was quickly cooled and finally the heat-shrinkable laminated film of thickness 50 μm was obtained. The evaluation results of the obtained film are shown in Table 6.

TABLE 5

| Layer composition (parts by mass) | | Example 12 | Example 13 | Example 14 | Example 15 | Comparative Example 6 | Comparative Example 7 | Comparative Example 8 |
|---|---|---|---|---|---|---|---|---|
| The second layer (mass %) | PO5 | 50 | 50 | 50 | 50 | 50 | — | 50 |
| | PO6 | 35 | 35 | 50 | 35 | 35 | | 35 |
| | PO7 | 15 | 15 | | 15 | 15 | | 15 |
| | PLA1 | 10 | 5 | 10 | 10 | | | |
| | PLA2 | | | | 10 | | | |
| | PETG | | | | | 20 | | |
| | AD5 | | | 5 | 5 | | | |
| | Thickness (μm) | 32 | 32 | 28 | 32 | 25 | | 50 |
| The first layer (mass %) | PLA1 | 100 | 100 | 50 | 80 | | 50 | — |
| | PLA2 | | | 50 | 20 | | 50 | |
| | PETG | | | | | 100 | | |
| | Thickness (μm) | 18 | 18 | 18 | 12 | 20 | 50 | |
| The third layer (mass %) | AD5 | — | — | 100 | 100 | 100 | — | — |
| | Thickness (μm) | | | 4 | 6 | 5 | | |
| Thickness ratio of front/back layers (%) | | 36 | 36 | 36 | 24 | 40 | | |

TABLE 6

| Evaluation items | Eample 12 | Example 13 | Example 14 | Example 15 | Comparative example 6 | Comparative example 7 | Comparative example 8 |
|---|---|---|---|---|---|---|---|
| Storage elastic modulus (GPa) | 1.4 | 1.4 | 1.3 | 1.4 | 1.2 | 3 | 1.1 |
| Heat shrinkage ratio (70° C.) (%) | 10 | 9 | 8.4 | 9.1 | 5 | 32 | 5.1 |
| Heat shrinkage ratio (80° C.) (%) | 37 | 34 | 42 | 44 | 36 | 63 | 19 |
| Natural shrinkage ratio (%) | 1.2 | 1.3 | 1.1 | 1.6 | 1.3 | 0.2 | 6.2 |
| Haze (%) | 7.1 | 6.8 | 6.2 | 6.4 | 14.2 | 0.7 | 2 |
| | ○ | ○ | ○ | ○ | X | ◎ | ◎ |
| Interlayer adhesive strength | ○ | ○ | ○ | ○ | ○ | — | — |
| Shrink finishing quality | ○ | ○ | ○ | ○ | ○ | X | X |

According to Tables 5 and 6, it is understood that the film of the present invention has shrinkage property in low temperature, favorable shrink finishing quality, natural shrinkage is small, and the interlayer peeling thereof is inhibited. On the other hand, a film obtained by using a polyester series resin instead of using a PLA series resin constituting the first layer showed high haze, thus it lacks transparency of the film (Comparative example 6). Moreover, in a case of a film that did not have the second layer, when the obtained film was made to cover a bottle, wrinkles remarkably occurred, thereby the film lacks shrink finishing quality (Comparative example 7). Further, a film which did not have the first layer, shrinkage ratio was insufficient; therefore natural shrinkage ratio was also large (Comparative example 8). In this way, it is understood that the heat-shrinkable laminated film of the present invention exhibits excellent shrinkage property in low temperature, film rigidity (stiffness at room temperature), shrink finishing quality, natural shrinkage property, and the interlayer peeling thereof is inhibited; it is also understood that this heat-shrinkable laminated film is suitably used for shrinkable packing, shrinkable bond-packing, shrinkable label, and so on.

Industrial Applicability

The film of the present invention has excellent shrinkage property in low temperature, stiffness, shrink finishing quality, and low natural shrinkage property, thereby it can be suitably used for containers requiring heat shrinkable property, especially used for shrink label. Moreover, a PLA series resin to be used in the invention is made from a plant-derived resin, it promotes a use of biomass.

Contents of entire descriptions, claims, drawings and abstracts of respective Japanese patent application No. 2005-3289 (filed on Jan. 11, 2005), Japanese patent application No. 2005-151831 (filed on May 25, 2005), and Japanese patent application No. 2005-251792 (filed on Aug. 31, 2005) are cited herein, and incorporated as a disclosure of the description of the present invention.

The invention claimed is:

1. A heat-shrinkable laminated film comprising:
   a first layer as a surface layer and a back layer of said film; and
   a second layer as a middle layer of said film,
   wherein the film has a heat shrinkage ratio of 30% or more in a film main shrinking direction when dipped in warm water of 80° C. for 10 seconds,
   the first layer comprises at least one polylactic acid series resin as the main component, and
   the second layer comprises at least one polyolefin series resin as the main component.

2. The heat-shrinkable laminated film according to claim 1, further comprising a third layer comprising an adhesive resin, wherein the third layer is provided between the first layer and the second layer.

3. The heat-shrinkable laminated film according to claim 1, wherein said second layer comprises a polylactic acid series resin of which mixing ratio is 3 parts by mass or more and 20 parts by mass or less to 100 parts by mass of the polyolefin series resin.

4. The heat-shrinkable laminated film according to claim 1, wherein said second layer comprises a polylactic acid series resin of which mixing ratio is 3 parts by mass or more and 50 parts by mass or less to 100 parts by mass of the polyolefin series resin.

5. The heat-shrinkable laminated film according to claim 2, wherein said second layer comprises an adhesive resin of which mixing ratio is 2 parts by mass or more and 10 parts by mass or less to 100 parts by mass of the polyolefin series resin.

6. The heat-shrinkable laminated film according to claim 1, wherein said polyolefin series resin comprises at least one of a polyethylene series resin and a polypropylene series resin.

7. The heat-shrinkable laminated film according to claim 2, wherein said adhesive resin comprises at least one selected from the group consisting of (a), (b) and (c):
   (a) a copolymer of ethylene with at least one selected from the group consisting of vinyl acetate, acrylic acid, methacrylic acid, ethyl acrylate, ethyl methacrylate, methyl acrylate, methyl methacrylate, maleic anhydride, and glycidyl methacrylate; or mixture of copolymers thereof;
   (b) a copolymer of a flexible aromatic series hydrocarbon and a conjugated diene series hydrocarbon, or hydrogenated derivatives thereof; and
   (c) a modified polyolefin series resin.

8. The heat-shrinkable laminated film according to claim 2, wherein the film has a heat shrinkage ratio of 40% or more in a film main shrinking direction when dipped in warm water of 80° C. for 10 seconds.

9. The heat-shrinkable laminated film according to claim 1, wherein the film has a natural shrinkage ratio of less than 3.0% after 30 days storage in an atmosphere of 30° C. and 50% RH.

10. The heat-shrinkable laminated film according to claim 1, wherein said first layer as the surface layer and back layer occupies a thickness of 10% or more and 70% or less with respect to a thickness of the film.

11. A molded product comprising a base material comprising the heat-shrinkable laminated film according to claim 1.

12. A heat-shrinkable label comprising a base material comprising the heat-shrinkable laminated film according to claim 1.

13. A container comprising the molded product according to claim 11.

14. A container comprising the heat-shrinkable label according to claim 12.

15. The heat-shrinkable laminated film according to claim 7, wherein the second layer comprises the adhesive resin included in the third layer.

16. The heat-shrinkable laminated film according to claim 15, wherein the adhesive resin comprises a copolymer of a flexible aromatic series hydrocarbon and a conjugated diene series hydrocarbon, or hydrogenated derivatives thereof.

17. The heat-shrinkable laminated film according to claim 16, wherein the second layer comprises 2 parts by mass or more and 10 parts by mass or less of the adhesive resin with respect to 100 parts by mass of the polyolefin series resin.

18. The heat-shrinkable laminated film according to claim 1, wherein the at least one polylactic acid series resin comprises a copolymer of L-lactic acid and D-lactic acid, where a copolymerization ratio of the L-lactic acid and the D-lactic acid is from 0.5/99.5 to 15/85.

* * * * *